US007852497B2

(12) United States Patent
Sato

(10) Patent No.: US 7,852,497 B2
(45) Date of Patent: Dec. 14, 2010

(54) METHOD OF CONTROLLING PRINTING CONTROL APPARATUS

(75) Inventor: Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1172 days.

(21) Appl. No.: 10/733,296

(22) Filed: Dec. 12, 2003

(65) Prior Publication Data

US 2004/0136023 A1    Jul. 15, 2004

(30) Foreign Application Priority Data

Dec. 26, 2002   (JP)   ............... 2002-378677

(51) Int. Cl.
*G06F 3/012* (2006.01)
*G06F 9/046* (2006.01)
*G06K 15/00* (2006.01)
*G06F 3/00* (2006.01)

(52) U.S. Cl. ............... 358/1.13; 358/1.15; 358/1.1; 358/1.14; 719/321; 718/1; 718/100; 718/103; 718/102

(58) Field of Classification Search ................ 358/1.9, 358/2.1, 1.13–1.18, 1.1; 715/700, 788–793, 715/759, 277, 240; 718/106, 104, 100, 1, 718/102; 719/321
See application file for complete search history.

(56) References Cited

U.S. PATENT DOCUMENTS

| 6,452,692 | B1 * | 9/2002 | Yacoub | 358/1.15 |
|---|---|---|---|---|
| 6,552,813 | B2 * | 4/2003 | Yacoub | 358/1.15 |
| 6,798,530 | B1 * | 9/2004 | Buckley et al. | 358/1.13 |
| 7,177,040 | B2 * | 2/2007 | Roosen et al. | 358/1.15 |
| 7,307,751 | B2 * | 12/2007 | Aritomi | 358/1.18 |
| 2002/0163665 | A1 * | 11/2002 | Iwata et al. | 358/1.15 |
| 2002/0163666 | A1 * | 11/2002 | Iwata et al. | 358/1.15 |
| 2003/0011805 | A1 * | 1/2003 | Yacoub | 358/1.15 |
| 2003/0053105 | A1 * | 3/2003 | Morooka et al. | 358/1.13 |
| 2003/0053106 | A1 * | 3/2003 | Kuroda et al. | 358/1.13 |
| 2003/0053129 | A1 * | 3/2003 | Morooka et al. | 358/1.15 |
| 2003/0103235 | A1 * | 6/2003 | Gomi | 358/1.15 |
| 2003/0103236 | A1 * | 6/2003 | Kato | 358/1.15 |
| 2003/0112456 | A1 * | 6/2003 | Tomita et al. | 358/1.13 |
| 2003/0123081 | A1 * | 7/2003 | Iwasaki | 358/1.15 |
| 2003/0184787 | A1 * | 10/2003 | Kuroda et al. | 358/1.13 |
| 2004/0036908 | A1 * | 2/2004 | Yagita et al. | 358/1.15 |

FOREIGN PATENT DOCUMENTS

JP    2001-290625    10/2001

* cited by examiner

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

An object of this invention is to perform optimal printing settings considering the features of the output method of a virtual printer in a system which performs printing processing using a plurality of printers. In a group printer driver UI (12), printing settings are done for items which are common between all printers concerning "redirect on error" printing, and each printer is assigned with the priority of a redirect destination candidate in "redirect on error" printing. A printer driver UI (16) for printing settings unique to a printer designated to the highest priority is displayed in a window together with the display of the group printer driver UI (12).

9 Claims, 20 Drawing Sheets

FIG. 9

PRINT

PRINTER
- PRINTER NAME (N):
- STATUS:
- TYPE:
- WHERE:
- COMMENT:

- PRINTER 1
- PRINTER 1 ~1003
- PRINTER 2
- PRINTER 3
- PRINTER 4
- PRINTER 5
- COLOR (GROUP PRINTER A) — 1001
- COLOR/MONOCHROME DISTRIBUTION (GROUP PRINTER B)
- MONOCHROME (GROUP PRINTER C)

1004 — PROPERTIES (P)

☐ PRINT TO FILE (L) — 1002

☑ COLLATE (T)

PAGE RANGE
- ⦿ ALL (A)
- ○ CURRENT PAGE (E)
- ○ PAGES (G):

ENTER PAGE NUMBERS AND/OR PAGE RANGES SEPARATED BY COMMAS. FOR EXAMPLE, 1,3,6,4-8

PRINT WHAT (W): DOCUMENT
PRINT (R): ALL PAGES

ENLARGEMENT/REDUCTION
- NUMBER OF PAGES PER SHEET (H): ONE PAGE
- PAPER SIZE (Z): NONE

OPTIONS (O)    OK    CANCEL

FIG. 12A

| MEMBER PRINTER ARRANGEMENT | SETTABLE ITEMS |
|---|---|
| ALL MEMBER PRINTERS ARE FUNCTION-UNCONTROLLABLE PRINTERS | COMMON SETTING ITEMS |
| EVEN ONE FUNCTION-CONTROLLABLE MEMBER PRINTER EXISTS | COMMON SETTING ITEMS + ENHANCED SETTING ITEMS |

FIG. 12B

| | SETTING ITEMS |
|---|---|
| COMMON SETTING ITEMS | LOGICAL PAPER SIZE |
| | OUTPUT PAPER SIZE |
| | USER-DEFINED PAPER |
| | PRINTING ORIENTATION |
| | MARGIN |
| | SCALING |
| | NUMBER OF COPIES |
| | EACH COPY (GROUP, COLLATE) |
| | SORTING (NON COLLATE) |
| | PAGE LAYOUT |
| | LAYOUT ORDER |
| | DOUBLE-SIDED/SINGLE-SIDED |
| | RESOLUTION |
| | GRAYSCALE |
| ENHANCED SETTING ITEMS | ROTATION |
| | WATERMARK |
| | PAGE OPTION |
| | BINDING DIRECTION |
| | BINDING MARGIN |
| | STAPLING |
| | STAPLING POSITION |
| | SADDLE STITCH (BOOKBINDING PRINTING) |
| | MAXIMUM NUMBER OF SHEETS SUBJECTED TO SADDLE STITCH |
| | BOOKBINDING PRINTING METHOD |
| | OPENING DIRECTION |
| | BOOKBINDING MARGIN |
| | LOWER LIMIT VALUE OF BOOKBINDING MARGIN |
| | PUNCHING |
| | Z-FOLDING |
| | FOUR-PLANE POSTCARD |
| | MIXED PAPER LOADING |
| | INSERTER |
| | PAPER FEED METHOD |
| | PAPER FEED FIELD |

METHOD OF CONTROLLING PRINTING CONTROL APPARATUS

FIELD OF THE INVENTION

The present invention relates to a printing control technique capable of using a plurality of printers.

BACKGROUND OF THE INVENTION

In recent years, network apparatuses are generally utilized, and many personal computers (to be referred to as PCs hereinafter) and printers are connected to a network. In such network environment, print job control systems in various forms can be established to efficiently print. A known example of the print job control system is a system (distributed printing system) which temporarily spools a print job for a document having a large number of pages or a document requiring a large number of copies, and distributes and outputs the print job to a plurality of printers for pages or copies in order to shorten the printing time.

Another known example is a system (color/monochrome distributed printing system) which outputs one document having color and monochrome pages by distributing color pages to a color printer and monochrome pages to a monochrome printer in order to reduce the printing cost and shorten the printing time.

There are also known a system (broadcast printing system) which simultaneously transmits one document by one printing designation to a plurality of printers and prints the document, and a system ("redirect on error" printing system) which automatically switches a printer when an error occurs in a printer which has transmitted a print job.

Printing settings in each printer are cumbersome in such print job control system comprised of a plurality of printers connected to a network. Thus, each printer in the system is generally so constituted as to operate on the basis of printing designation from one virtual printer (group printer driver). The user suffices to perform printing settings to only the group printer driver (printing utility). There is also known a technique of reflecting an OR/AND arithmetic result based on the functions of printers in the user interface (UI) of a virtual printer adopting distributed printing serving as a virtual job, and enabling settings for a plurality of printers.

Details of this technique are disclosed in, e.g., Japanese Patent Laid-Open No. 2001-290625.

In addition to distributed printing, virtual jobs cope with various output methods such as color/monochrome distributed printing, broadcast printing, and redirect printing. When virtual printer UI control complying with conventionally known rules is executed for various virtual jobs and corresponding virtual printers, a convenient UI which fully considers the feature of each virtual job cannot be provided.

For example, a "redirect on error" printing system has a plurality of printers as candidates used in redirection. If only common settings can be done for all member printers through a group printer driver setting UI, the features of a member printer used first cannot be maximized.

SUMMARY OF THE INVENTION

It is an object of the present invention to perform optimal printing settings considering the features of the output method of a virtual printer in a system which performs printing processing capable of using a plurality of printers.

According to one aspect of the present invention, preferably, a control method in a printing control apparatus capable of executing printing processing of a predetermined output method using a plurality of member printers, comprises: a first activation step of activating a first user interface based on functions of the plurality of member printers concerning a virtual printer, in accordance with designation of the virtual printer corresponding to a first output method; and a second activation step of activating a second user interface corresponding to a printer driver of a representative member printer which becomes representative when a virtual printer corresponding to a second output method is designated.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 9 is a view showing an example of a printing setting UI according to the embodiment;

FIG. 12A is a table showing the correspondence between the member printer arrangement and settable items according to the embodiment;

FIG. 12B is a table showing an example of detailed setting items of common and enhanced setting items;

DETAILED DESCRIPTION OF THE PREFERRED EMBODIMENTS

Preferred embodiments of the present invention are described in detail in accordance with the accompanying drawings.

<Configuration Example of Printing Processing System>

Figure 1:
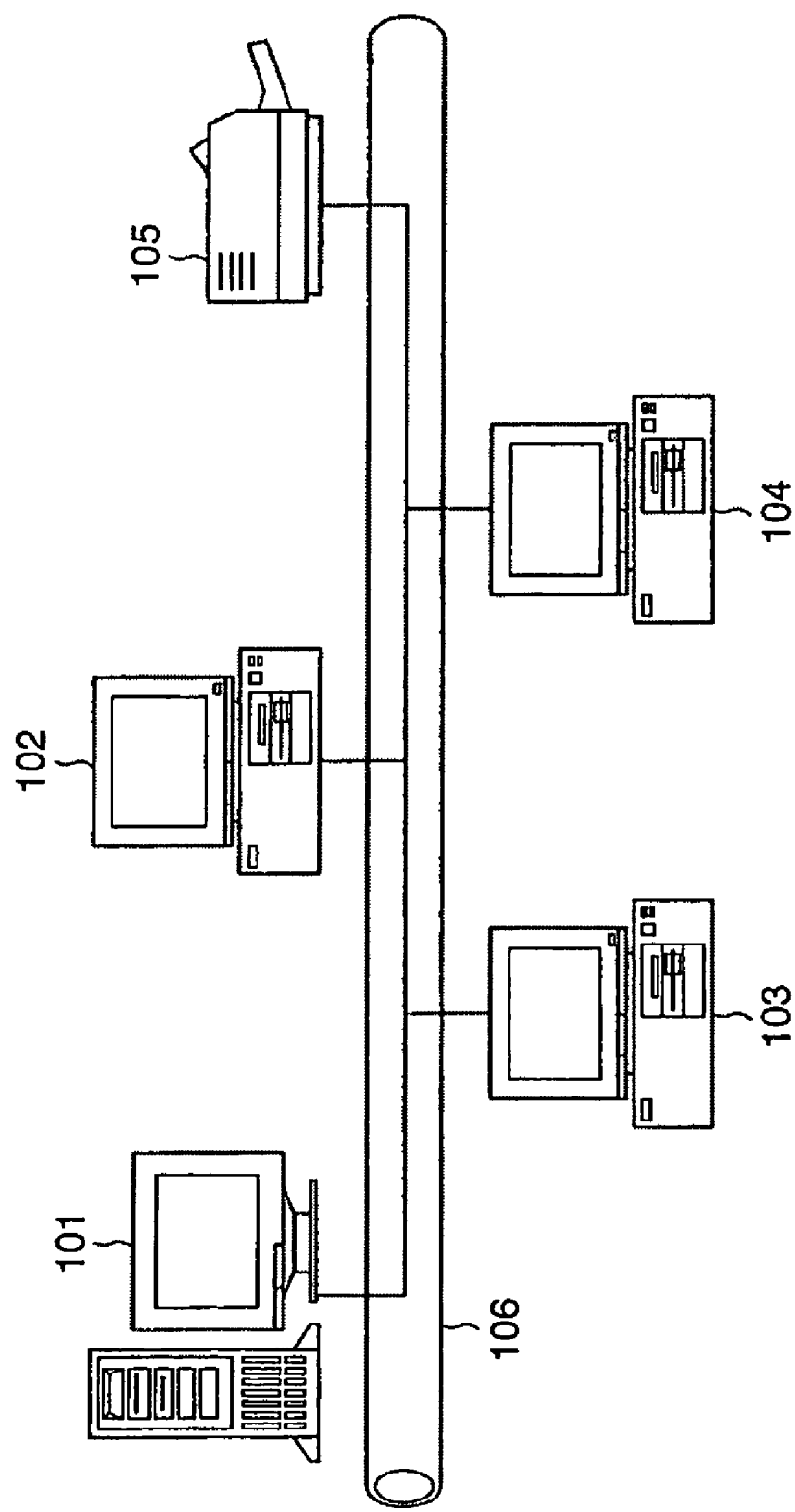
FIG. 1 is a view showing the configuration of a printing processing system according to an embodiment.

FIG. 1 is a view showing the configuration of a printing processing system according to an embodiment.

In FIG. 1, reference numerals 101, 102, 103, and 104 denote network computers which are connected to a network 106, can communicate with each other, and are typically personal computers (PCs).

Of these network computers, the computers 102, 103, and 104 are client computers (to be referred to as clients hereinafter), are connected to the network 106 via network cables such as Ethernet® cables, and can execute various programs such as an application program. The clients 102, 103, and 104 incorporate a printer driver having a function of converting print data into a corresponding printer language. Each client is assumed to support various printer drivers.

The network computer 101 is a server computer (to be referred to as a server hereinafter), is connected to the network 106 via a network cable, stores a file used in the network, and monitors the use state of the network 106. The server also functions as a print server which manages a printer connected to the network 106. More specifically, the print server 101 has a function of storing and printing print jobs containing print data to which print requests have been issued from the client computers 102, 103, and 104, a function of receiving job information containing no print data from the client computers 102 to 104, managing the printing order, and notifying a client corresponding to the printing order of a transmission permission for a print job containing print data, and a function of acquiring the status of a network printer (printer device) 105 (to be described later) and various pieces of information of print jobs, and notifying the client computers 102 to 104 of the pieces of information.

The network printer 105 serves as a printing control apparatus, and is connected to the network 106 via a network interface (not shown). The network printer 105 analyzes a print job which is transmitted from a client computer and contains print data, converts each page into a dot image, and prints the image. FIG. 1 shows only one network printer 105, but other network printers are connected. Each network printer may have different functions.

The network 106 is connected to the client computers 102 to 104, print server 101, network printer 105, and the like.

<Example of Hardware Configuration of Network Computer>

Figure 2:
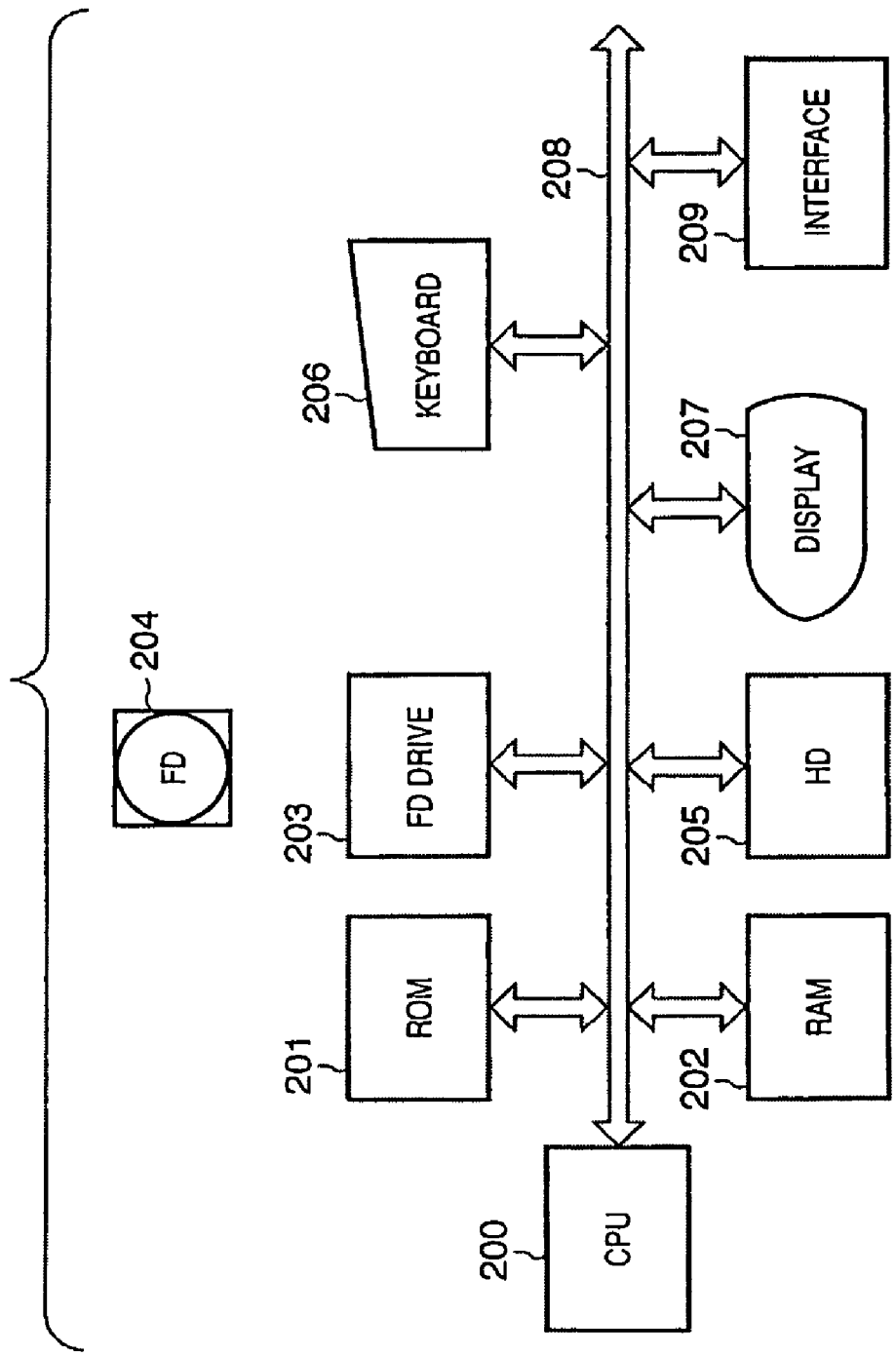
FIG. 2 is a block diagram showing the configuration of a computer in the printing processing system according to the embodiment.

FIG. 2 is a block diagram for explaining the configuration of a computer used as each of the clients 102 to 104 and print server 101. The client computers 102 to 104 also have the same or almost the same hardware configuration as that of the print server 101 in this embodiment, but may have dedicated hardware configurations.

In FIG. 2, reference numeral 200 denotes a CPU which controls the overall apparatus. The CPU 200 performs control of executing an application program, a printer driver program, an OS, a network printer control program according to the embodiment, and the like which are stored in a hard disk (HD) 205, and temporarily storing in the RAM 202 information, files, and the like necessary to execute the programs.

Reference numeral 201 denotes a ROM serving as a storage means. The ROM 201 internally stores programs such as a basic I/O program, and various data such as font data and template data used for document processing. Reference numeral 202 denotes a RAM serving as a temporary storage means. The RAM 202 functions as a main memory, work area, and the like for the CPU 200.

Figure 5:
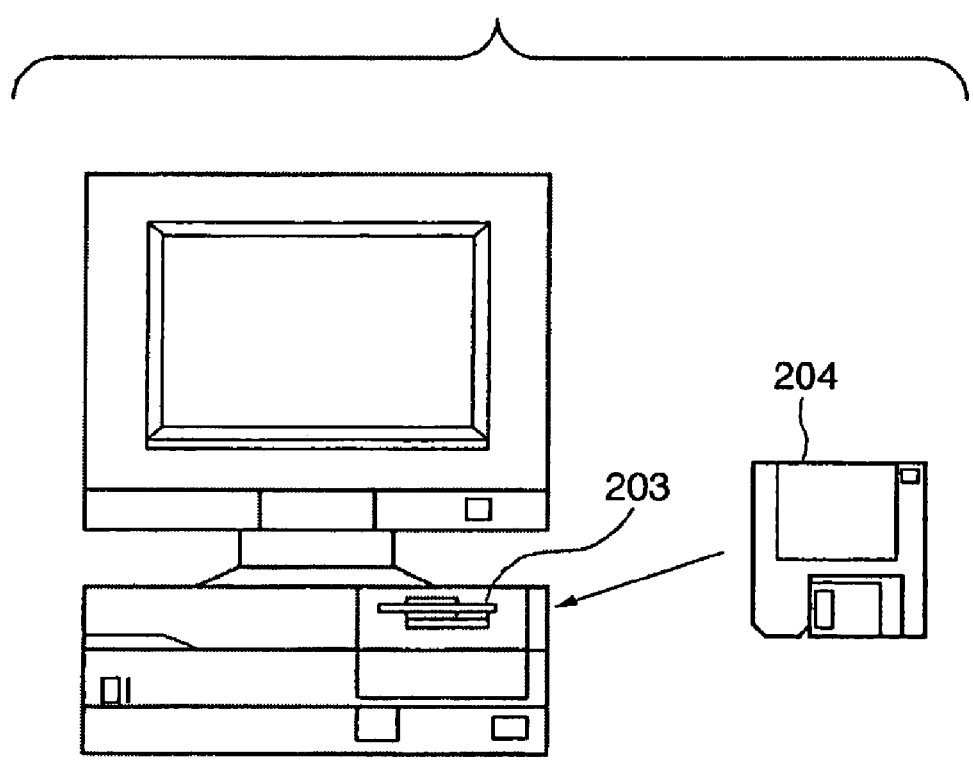
FIG. 5 is a view showing the relationship between the FD drive of the computer and the FD to be inserted into the FD drive according to the embodiment.

Reference numeral 203 denotes a floppy disk drive serving as a storage medium loading means. As shown in FIG. 5 (to be described later), a program or the like stored in an FD 204 serving as a storage medium can be loaded to the computer via the FD drive 203. The FD (Floppy Disk) 204 serving as a storage medium computer-readably stores a program. The storage medium is not limited to an FD, and may be an arbitrary medium such as a CD-ROM, CD-R, CD-RW, PC card, DVD, IC memory card, MO, or memory stick.

The hard disk (HD) 205 is one of external storage means, and functions as a large-capacity memory. The hard disk 205 stores an application program, printer driver program, OS, network printer control program, related program, and the like. A spooler serving as a spool means is ensured in the hard disk 205. The spool means is a client spooler in the client, and a server spooler in the print server. In the print server, a table for storing job information received from a client and controlling the order is also generated and stored in the external storage means.

Reference numeral 206 denotes a keyboard serving as an instruction input means. The keyboard 206 allows the user to input and designate a device control command or the like to the client computer or the operator or administrator, to the print server. Reference numeral 207 denotes a display serving as a display means. The display 207 displays a command input from the keyboard 206, a printer status, and the like.

Reference numeral 208 denotes a system bus which controls a data flow in a computer serving as a client or print server. Reference numeral 209 denotes an interface serving as an input/output means. An information processing apparatus exchanges data with an external apparatus via the interface 209.

This computer configuration is merely an example, and the present invention is not limited to the configuration example in FIG. 2. For example, the storage destinations of data and programs can be changed to the ROM, RAM, HD, or the like in accordance with the features of the data and programs.

Figure 3:
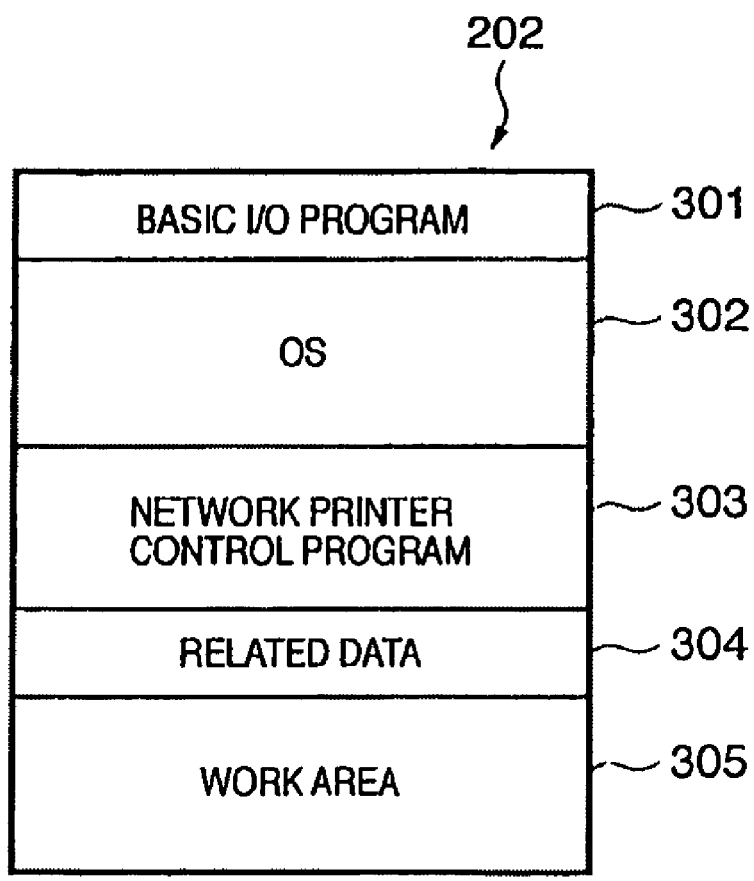
FIG. 3 is a view showing an example of the memory map of the RAM of the computer according to the embodiment.

FIG. 3 is a view showing an example of the memory map of the RAM 202 shown in FIG. 2. FIG. 3 shows a memory map when the network printer control program loaded from the FD 204 is loaded to the RAM 202 and becomes executable.

In the embodiment, the network printer control program and related data are directly loaded from the FD 204 to the RAM 202 and executed. Alternatively, every time the network printer control program is to be executed, the program may be loaded to the RAM 202 from the HD 205 in which the network printer control program has already been installed from the FD 204. The medium which stores the network printer control program may be a CD-ROM, CD-R, PC card, DVD, or IC memory card, in addition to the FD. Further, the network printer control program may be stored in the ROM 201, regarded as part of the memory map, and directly executed by the CPU 200. Software which realizes functions equivalent to the above devices can replace the hardware apparatus.

In the following description, the network printer control program will be simply referred to as a printing control program or printer driver. In the client, the printing control program includes a program for performing control of designating a change of the printing destination of a print job and designating a change of the printing order. In the print server, the printing control program includes a program for controlling the order of print jobs and designating the end of printing of a print job, a printing destination change request, or the like. The printing control program according to the embodiment may separate a module installed in the client and a module installed in the print server. Alternatively, one printing control program may function as a client program or print server program depending on the running environment. Also, both a module having a client function and a module having a print server function can be installed in one computer and pseudo-parallel-run simultaneously or in time division.

Reference numeral 301 denotes a basic I/O program. The basic I/O program 301 is an area which holds a program having an IPL (Initial Program Loading) function of loading an OS from the HD 205 to the RAM 202 and starting OS operation upon turning on the computer. Reference numeral 302 denotes an OS (Operating System); and 303, a network printer control program which is stored in an area ensured in the RAM 202. Reference numeral 304 denotes related data which is stored in an area ensured in the RAM 202. Reference numeral 305 denotes a work area which ensures an area for executing the printing control program by the CPU 200.

Figure 4:
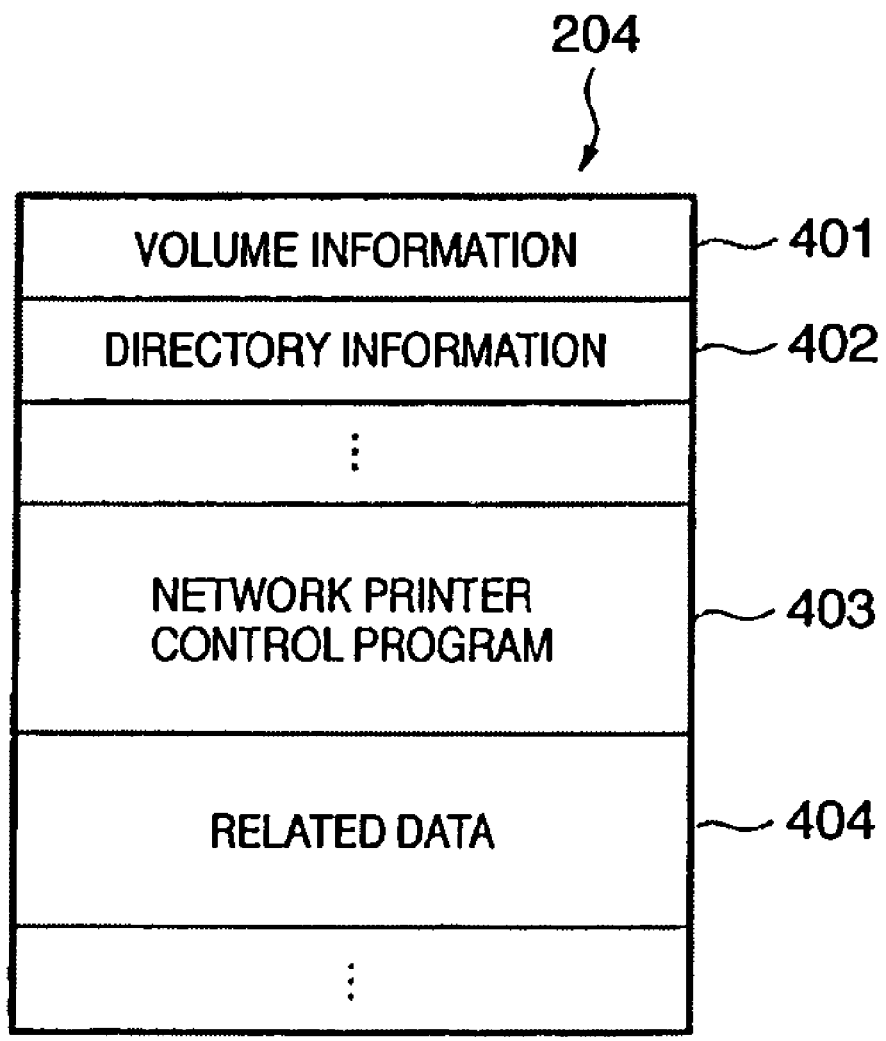
FIG. 4 is a view showing an example of the memory map of an FD according to the embodiment.

FIG. 4 is a view showing an example of the memory map of the FD 204 shown in FIG. 2.

In FIG. 4, reference numeral 401 denotes volume information representing data information; 402, directory information; 403, a network printer control program serving as a printing control program to be described in the embodiment; and 404, related data. The network printer control program 403 is programmed on the basis of a flow chart to be described in the embodiment. In the embodiment, both the client and server adopt the same configuration.

FIG. 5 is a view showing the relationship between the FD drive 203 shown in FIG. 2 and the FD 204 to be inserted into the FD drive 203. The same reference numerals as in FIG. 2 denote the same parts. In FIG. 5, the FD 204 stores the network printer control program and related data to be described in the embodiment.

<Example of Software Configuration in Printing Processing System>

The technical terms in the embodiment will be explained.

A virtual printer which virtually bundles a plurality of printers as one printer will be called a "group printer", and bundled printers will be called "member printers". Since a virtual printer driver and device driver corresponding to predetermined output ports are made to correspond to the group printer and member printers, the group printer and member printers can be considered in correspondence with the drivers.

The group printer will be explained in more detail. A virtual driver which generates data for generating an intermediate format file (general-purpose print file) on the basis of a drawing instruction generated from an application via an OS will be called a group printer driver. A job control print service (to be described later) designates each individual printer driver to print so as to generate a page description language on the basis of the intermediate format file. A printer corresponding to each individual printer driver will be called a member printer. Each member printer finally corresponds to a specific device.

In the embodiment, a printer driver which interprets a drawing instruction (generally called DDI or GDI) or EMF (Enhanced Metafile Format) output via an OS such as Windows® in accordance with a printing instruction in an application, generates a page description language, and outputs data to a device will be called a normal printer driver, and a device at this time will be called a standard device so as to discriminate them from a group printer and member printer. The OS is not limited to Windows®, and can be any OS as far as it has a drawing instruction. A combination of a printer driver and printer output port may be called a printer so as to discriminate them from a device printer. For example, designation of a combination of a logical port (job control port monitor) in FIG. 7 and a group printer driver will be called designation of a group printer.

Figure 6:
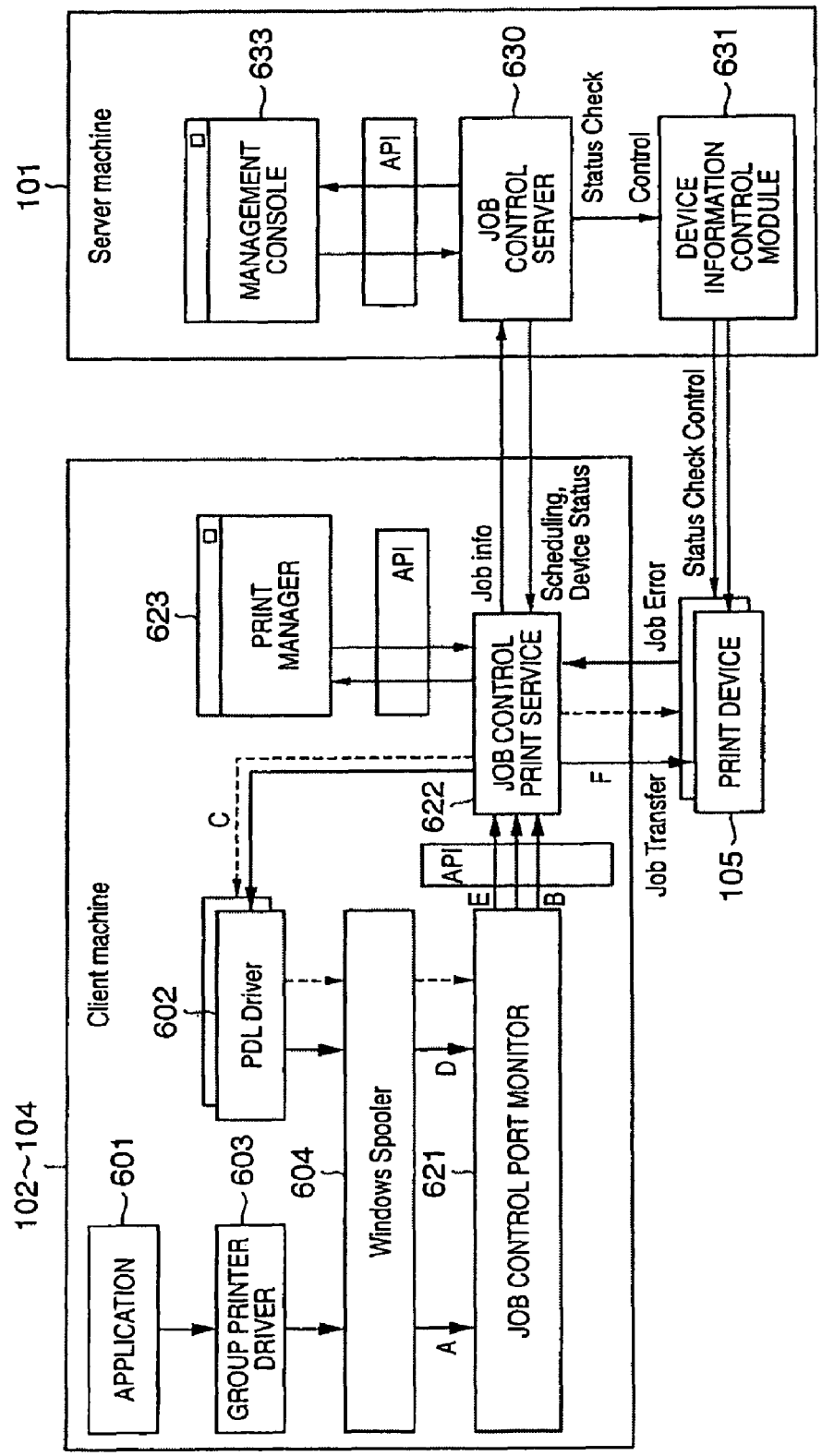
FIG. 6 is a block diagram showing the configuration of a printing control module.

FIG. 6 is a block diagram showing how to process in the print job control system a print job containing a drawing command issued from a general application such as Microsoft Word® in the client-server model of the system.

In general, when printing is designated, an application program generates a series of drawing instructions via the OS. The generated drawing instructions are converted into a predetermined format via the printer driver, and transferred to a Windows spooler. The Windows spooler takes a sequence of transferring print job data to a port monitor which is selected and designated by the user via the user interface, and transmitting the data to the printer device. In the embodiment, the user designates printing by specifying a print job control system port monitor 621 (to be simply referred to as a job control port monitor hereinafter) for the above-mentioned normal operation.

An application program 601 generates a series of drawing instructions via the OS. A group printer driver 603 which has received the drawing instructions generated via the OS generates general-purpose document data for generating a general-purpose print file, and transmits the file as print job data not to a conventional port monitor for transmitting print job data to a printer device, but to the job control port monitor 621. Pieces of printing setting information such as the paper size and stapling that are set via a printer driver interface are also transmitted to the job control port monitor 621.

The job control port monitor 621 transmits general-purpose print document data serving as print job data not to the printer device 105 but to a print job control system print service 622 (to be simply referred to as a job control print service hereinafter). The job control print service 622 performs print job control processing (to be described later) for print job data.

A print job control system print manager 623 (to be simply referred to as a job control print manager hereinafter) is a program which provides a user interface for checking the status of a print job in the job control print service 622 or processing a print job. The job control print manager 623 exchanges information and designation with the job control print service 622 via the software interface (API: Application Program Interface) of the job control print service 622. As detailed processing, the print manager 623 issues to the job control print service 622 an event which specifies a device, and the job control print service 622 monitors the status of the device based on the issued event and notifies the print manager 623 of the monitoring result.

A print job control system server 630 (to be simply referred to as a job control server hereinafter) concentratedly controls (schedules) the timing at which the job control print services 622 in the clients 102 to 104 transmit print job data to the printer device 105. A print job control system management console 633 (to be simply referred to as a job control management console hereinafter) can monitor the overall print job control system by exchanging information and designation with the job control server 630 via an API for access by software of the job control server 630.

The job control server 630 communicates with the printer device 105 by using a device information control module 631, and acquires and processes a print job in each printer and information on the operation status. The acquired information can be transferred to the job control print services 622 in the clients 102 to 104.

<Operation Example of Printing Processing System>

Printing from the group printer driver 603 in the embodiment will be explained.

The group printer driver 603 converts a series of drawing commands generated by the application program 601 into general-purpose intermediate format data (corresponding to the above-mentioned general-purpose document data) independent of the printer device or OS type. The general-purpose intermediate format data is supplied from a Windows spooler 604 to the job control print service 622 ((B) in FIG. 6) via the job control port monitor 621 ((A) in FIG. 6). The general-purpose intermediate format data is constructed in a general-purpose print file. The structure of the general-purpose print file will be described later.

The job control print service 622 generates a drawing command on the basis of the general-purpose print file in accordance with the type of job control performed for the print job ((C) in FIG. 6). A PDL driver 602 converts the drawing command into a PDL file interpretable by the printer device 105.

FIG. 6 illustrates an example of performing redirect printing when the job control print service 622 detects a printer error in the print job. The solid line represents a member job scheduled for printing at first, and the broken line represents a job generated for redirect printing ((C) in FIG. 6). The PDL file generated by the PDL driver 602 is transferred to the job control print service 622 again ((E) in FIG. 6) via the Windows spooler 604 and job control port monitor 621 ((D) in FIG. 6). The job control print service 622 transmits PDL print job data to the printer device 105 in accordance with the instruction of the job control server 630 ((F) in FIG. 6).

The job control print service 622 logically divides one general-purpose print file into a plurality of print jobs in accordance with the designation of a printing directive in the general-purpose print file and transmits the print jobs to different printer devices, or retransmits, to another printer device, print job data which has been transmitted once. (C), (D), (E), and (F) shown in FIG. 6 represent print job data paths in such case.

When a general-purpose print file is created by application software and the application software directly loads the general-purpose print file as a print job, the method of transferring information to the group printer driver 603 and the processing contents of the group printer driver 603 are different from those in a general application. In the case of a general application, as described above, the application calls a Windows GDI function similarly to a normal printer driver in transferring drawing information to the group printer driver 603, and the group printer driver 603 generates a general-purpose print file in response to the call. In the case of an application which directly creates a general-purpose print file, the application has already had a general-purpose print file and supplies it to the group printer driver 603. If necessary, the group printer driver 603 rewrites a printing directive in the general-purpose print file on the basis of a printing method set in advance, and sends the printing directive to the Windows spooler 604.

<Structure Example of General-Purpose Print File>

Figure 8:
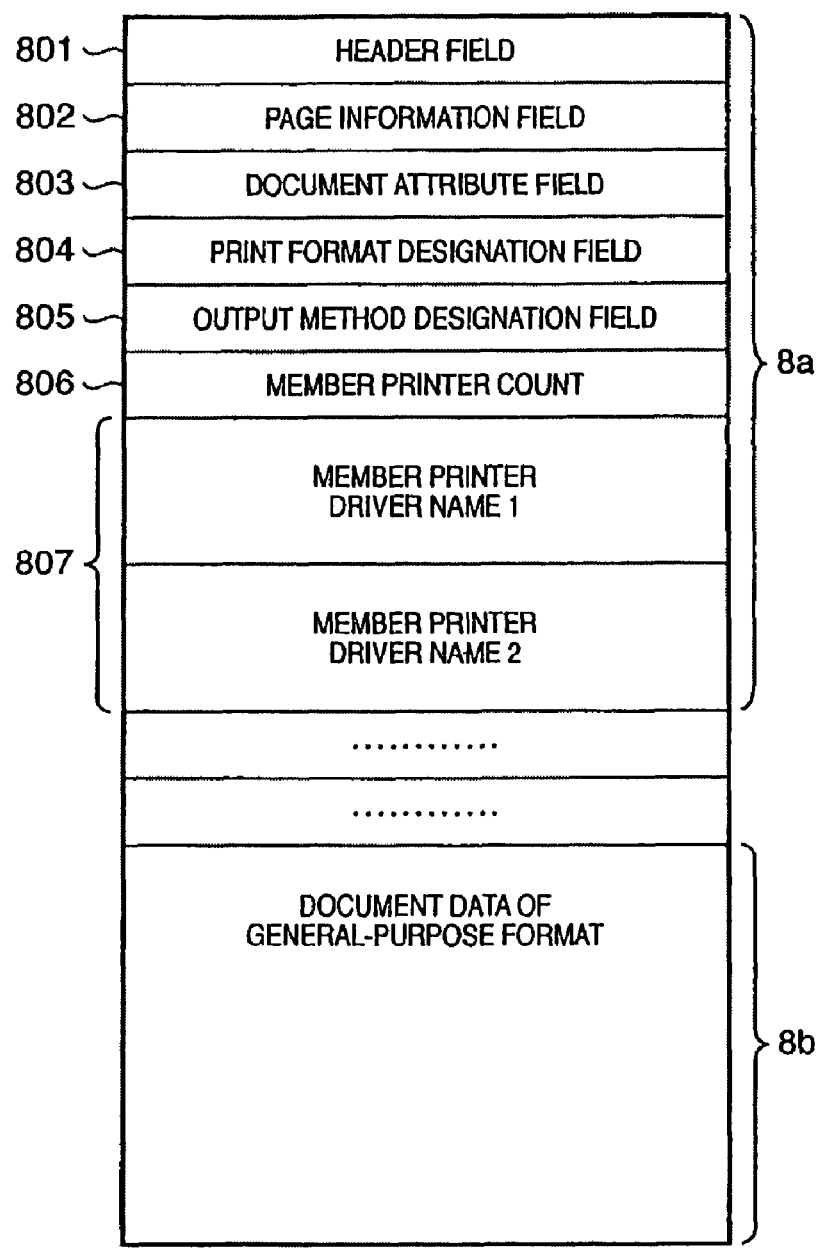
FIG. 8 is a view showing an example of the structure of a general-purpose print file.

FIG. 8 is a view showing an example of the structure of a constructed general-purpose print file.

The general-purpose print file used in the embodiment is formed by a printing designation field 8a (corresponding to the above-mentioned printing directive) and a document data field 8b. The printing designation field 8a is a field which describes document information and printing designation. The document data in the field 8b is obtained by converting application document data into general-purpose format data, as described above. The document data 8b has a data format which does not or can hardly depend on the printer language and OS type.

Converted data (general-purpose print data) after converting application data is assumed to be data of a format which can be utilized as printing resource data and can be edited again by a word processor application or the like. Of substantial standard formats, for example, the XML format, the EMF format provided by the Windows system, the PDF (Portable Document Format) format by Adobe Systems Incorporated, and the SVG format can be employed for general-purpose print data of a general-purpose format.

Although not shown, the general-purpose print file contains DEVMODE corresponding to each member printer. DEVMODE contains both common setting items and enhanced setting items to be described in detail later with reference to FIGS. 12A and 12B.

The general-purpose print file will be explained in more detail. The printing designation field 8a is formed by a header field 801, page information field 802, document attribute field 803, print format designation field 804, output method designation field 805, member printer count 806, member printer driver name 807, and the like.

The header field 801 stores information such as the version identification of the file and file information. The page information field 802 stores information such as the number of pages of document data and the size of each page in the document data field 8b.

The print format designation field 804 stores output format information such as the print page range, the number of print copies, document data imposition information (N-UP, bookbinding printing, or the like), stapling designation, and punching designation which are set via the UI of the group printer driver or the UI of each member printer. Stapling and punching may be designated for each page (subset stapling or the like). Contents set via the member printer UI are reflected in the printing designation field 804, and also reflected and saved in DEVMODE corresponding to each member printer.

The output method designation field 805 stores output method information such as distributed printing, broadcast printing, redirect printing, or normal printing (non-redirect printing) as an output method. When redirect printing is set at the output method designation field 805, the output method designation field 805 further stores printer information with priority information (first candidate, second candidate, . . . . ) Which of these output methods is stored corresponds to the type of virtual printer selected via a printer list 1002 in FIG. 9 or an output method set via a combo box 12a in FIG. 18.

The member printer count 806 is a field which stores the number of member printers associated with each other by the group printer driver. The member printer driver name 807 is a field which stores the printer driver names of member printers. The member printer driver name 807 has storage areas equal in member to the printer count 806.

In the job control print service 622 shown in FIG. 6, settings in the group printer driver GUI are stored in the printing designation field 8a in generating a general-purpose print file from general-purpose print intermediate format data. The job control print service 622 also executes processing of recording general-purpose print intermediate format data received from the group printer driver in the document data field 8b of the general-purpose print file.

<Example of Relationship Between Windows Print System and Print Job Control System>

The print job relationship between a print system provided by Windows and the print job control system in FIG. 7, and the processing outline will be described in more detail. The same reference numerals as in FIG. 6 denote the same functions, and a detailed description thereof will be omitted.

Figure 7:
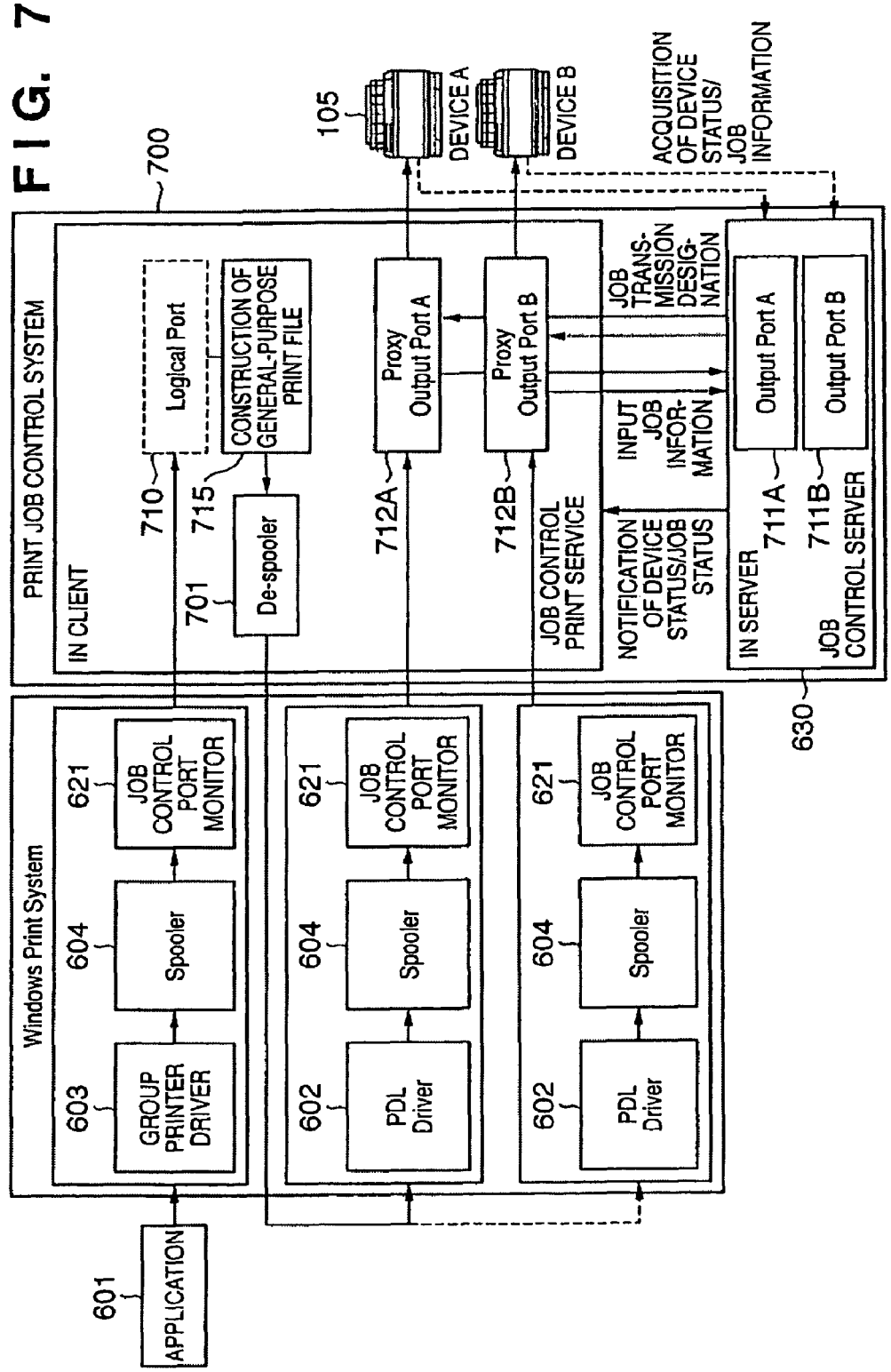
FIG. 7 is a block diagram for explaining the configuration of a printing control system according to the embodiment.

In FIG. 7, a print job control system 700 exhibits the range of the print job control system over the physical machines of the print server 101 and clients 102 to 104 in which the control program runs. An output port 711 managed by the print server is associated with a proxy output port 712 of the job control print service 622 of the client, and unitarily manages all proxy output ports in the clients each associated with one port. In the embodiment, actual print job data is held in the proxy output port 712 of each client.

The job control server 630 designates only print job transmission to the job control print service 622 without performing transmission processing of print job data itself. In response to this instruction, the job control print service 622 of the client transmits print job data to the printer device 105.

Processing when the print job control system 700 performs value-added printing such as redirect printing will be explained.

When the print job control system 700 performs value-added printing such as redirect printing, the user or application program 601 must a print job to a printer assigned to the group printer driver 603. The job control print service 622 receives via the job control port monitor 621 general-purpose print intermediate format data processed by the group printer driver 603. The job control print service 622 constructs a general-purpose print file (715 in FIG. 7) from the general-purpose print intermediate format data, and designates printing complying with the designation contents of the printing designation field 8a described above to a despooler 701. The job control print service 622 issues a job (member job) to another printer assigned with a PDL driver via the despooler 701, and causes the printer to print.

At this time, the despooler 701 processes document data in the document data field 8b in accordance with designation based on the interpretation of the printing designation field 8a of the general-purpose print file in the job control print service 622, converts the document data into Windows* GDI, designates the printer driver to print, and issues a print job. For example, when designation corresponding to 2-UP is recorded in the print format designation field 804, the despooler 701 designates the member printer via DEVMODE to reduce and lay out document data of two pages on one paper sheet. When stapling is designated in the print format designation field 804, the despooler 701 designates stapling via DEVMODE. For redirect printing, the despooler 701 issues a job to a member printer at the redirect destination that is described in the printing designation field 8a. In processing a reduction layout such as 2-UP, the despooler itself may designate the member printer for 1-UP via DEVMODE so as to realize the reduction layout on the basis of the contents of the print format designation field 804.

In issuing a job to a member printer, the despooler 701 must creates DEVMODE of a member printer as printing designation corresponding to the member printer driver. The DEVMODE is generated by properly reflecting, in each member printer DEVMODE, contents which are described in the printing designation field 8a or DEVMODE saved in correspondence with each member printer.

The job control print service 622 in the client receives, via the job control port monitor 621, PDL data of each member job rendered by the PDL driver 602. The job control print service 622 notifies the print server of information on the received job (PDL data), and temporarily holds the job data in the proxy output queue (proxy output port) 712. Upon reception of transmission designation from the job control server 630, the job control print service 622 transmits the job data to the printer device 105.

<Control Processing of Group Printer Driver>

Control of the group printer driver 603 for the print job control system according to the embodiment of the present invention will be explained.

FIG. 9 shows an example of a graphical user interface (to be referred to as a "GUI" or "UI" hereinafter) displayed on the display 207 when a predetermined application designates printing settings.

The printer list 1002 describes a plurality of printer names. Printers in the list include both a virtual printer (group printer) 1001 and a normal printer (corresponding to a single printer driver and device) 1003.

When a property button 1004 is selected (clicked with a mouse), the property of a printer selected in the current printer list 1002 is displayed. In FIG. 9, group printer A corresponding to the redirect printing output method is selected.

Figure 10:
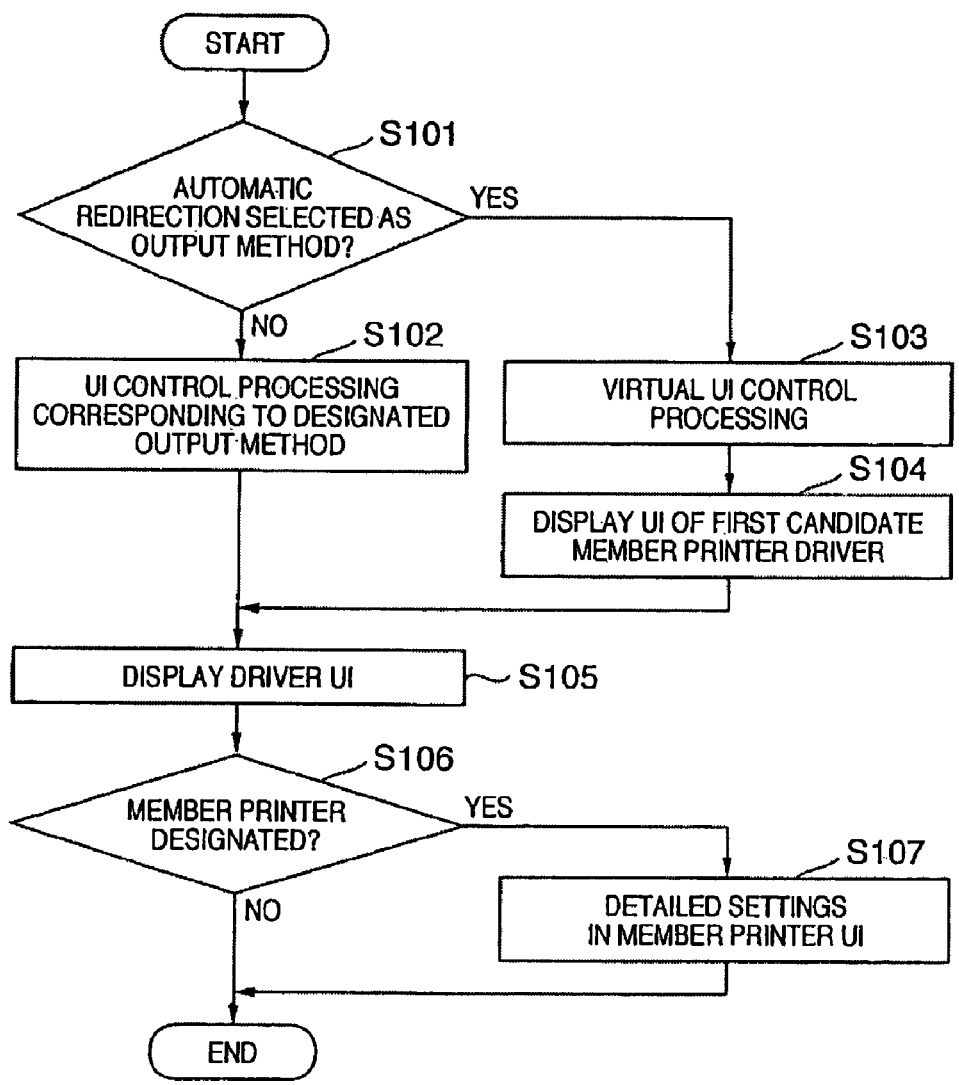
FIG. 10 is a flow chart showing UI display processing according to the embodiment.

FIG. 10 is a flow chart showing UI display processing according to the embodiment. A program corresponding to the flow chart is contained in a control program stored in a predetermined storage medium such as the HD (Hard Disk) 205, loaded to the RAM 202, and executed by the CPU 200.

In step S101, a default output method or the output method of a group printer selected via a UI as shown in FIG. 9 is checked. For example, this check is realized by referring to the output method designation field 805 in FIG. 8 or acquiring the printer attribute of each of a group printer (virtual printer) and member printer.

If a group printer corresponding to redirect printing as an output method is selected, the processing advances to step S103; if another output method (e.g., distributed printing, broadcast printing, or color/monochrome printing) is selected, to step S102. In step S102, this output method is specified as distributed printing or broadcast printing other than redirect printing, and UI control processing corresponding to the specified output method is executed. UI control processing executed in step S102 includes display processing and conflict processing serving as conflict resolution processing for each item that complies with a predetermined rule such as OR or AND. This will be explained in detail with reference to FIGS. 11 to 15.

Figure 19:
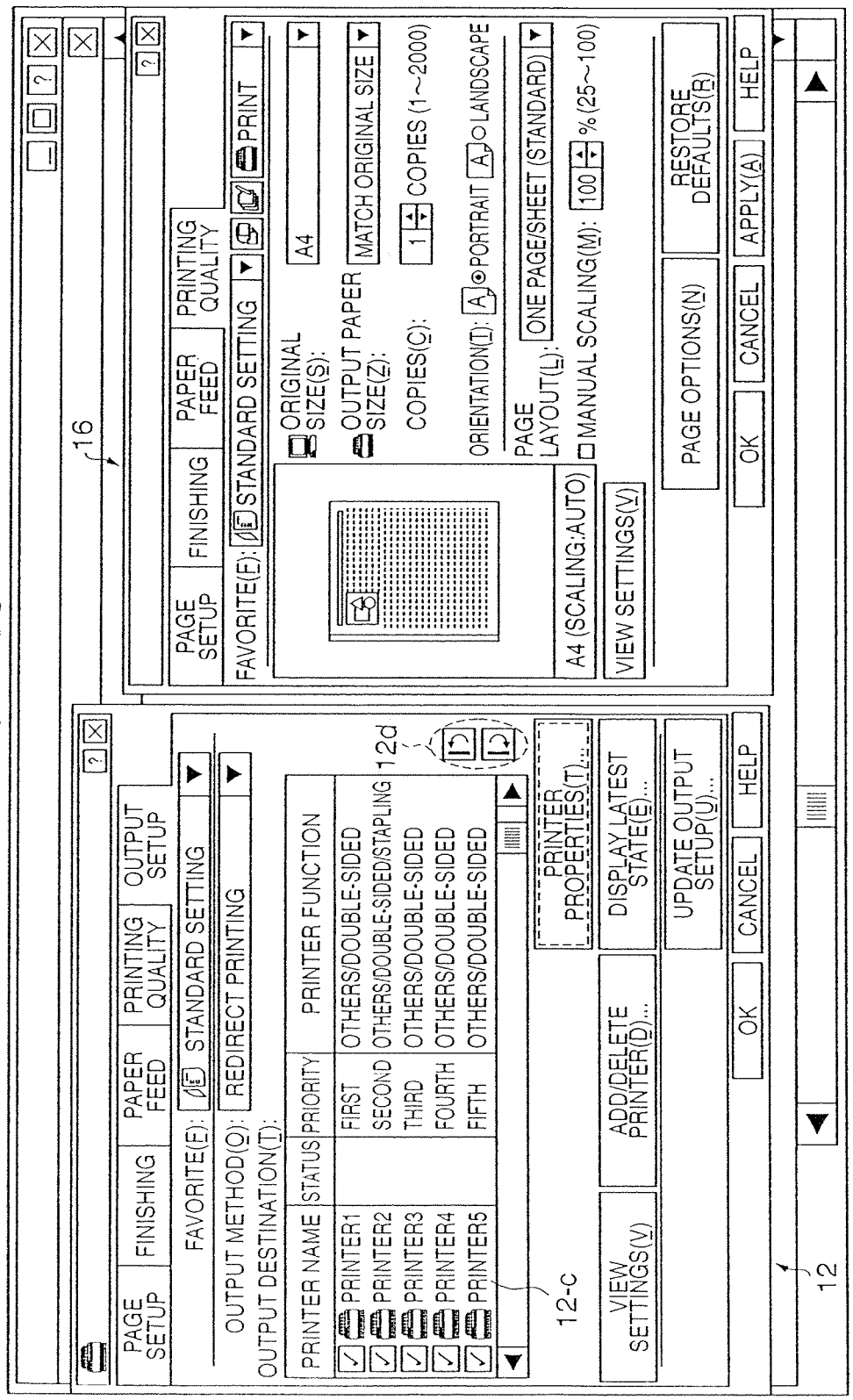
FIG. 19 is a view showing an example in which a group printer driver UI and member printer driver UI are simultaneously displayed according to the embodiment.

In step S105, a group printer driver UI or a UI as shown in FIG. 19 (to be described later) is displayed on the basis of the result of conflict processing in step S102, and items are set in accordance with the user designation. As for an item for which no function exists as a result of conflict processing in step S102, UI control of graying out or not displaying the item is performed. As for an item for which the function exists, no UI control is done.

If use of a group printer corresponding to redirect printing is designated in step S101, the processing advances to step S103, as described above. In step S103, a UI including setting items in generating general-purpose document data by the group printer driver 603 or job print control print service 622 is displayed. The setting items include an item which specifies whether to generate general-purpose document data by the gray scale, an item which specifies the resolution of general-purpose document data, and an item which designates a compression method (jpeg compression method, zip compression method, or the like) when a general-purpose print file contains general-purpose document data. Also, the setting items include a setting item for changing and setting the priority order of member printers in redirect printing, and a setting item, such as addition/delete of a member printer (12b), unique to a virtual job which targets a plurality of member printers. These setting items complement a UI provided in step S104.

Setting items such as the paper size and stapling designation are so controlled as to be set from the UI provided in the subsequent step S104, and are so restricted as not to be set from the UI provided in step S103.

The processing advances to step S104 to specify a representative member printer having the highest priority in redirect printing, and display the UI of the representative member printer on the display.

The provided UI corresponds to diversion of a printer driver UI prepared in advance for the representative member printer. In addition to diversion, the UI may also be used to generate PDL data from application data in processing executed by designating a specific printer device.

The processing order of steps S103 and S104 is not particularly limited. The order in the flow chart may be reversed, or steps S103 and S104 may be parallel-processed. The display control timing of FIG. 18 or 19 in steps S103 and S104 may be a timing when a predetermined printer is selected and designated from the printer list 1002 in FIG. 9, or when a predetermined printer is selected and then the property button 1004 is clicked. Another display control timing may also be adopted. That is, the display timing is not particularly limited as far as a UI as shown in FIG. 19 is displayed on the basis of the type of selected printer.

In step S105, a UI based on processes in steps S103 and S104 is displayed on the display of the client. Setting information set from the displayed UI is reflected in the printing designation field 8a of FIG. 8 or DEVMODE corresponding to each member printer, and utilized for printing processing. More specifically, printing settings set in steps S103 and S104 are used for redirect printing based on a general-purpose print file by the above-mentioned mechanism shown in FIGS. 6 and 7.

If the representative member printer is a function-uncontrollable member printer, only common setting items are reflected in the printing designation field 8a, and enhanced setting items are reflected in DEVMODE. As for the enhanced setting items, setting information of DEVMODE is utilized by the despooler upon printing designation.

In this manner, the UI of the first candidate printer in the priority order of redirect printing is directly provided. The UI can be quickly displayed without any conflict processing accompanying performance acquisition processing such as step S1803. At the same time, detailed settings which maximize the function of the first candidate member printer can be achieved.

In step S107, a member printer UI is opened to set details for items which are not set in the group printer driver UI.

If the member printer driver UI is opened, items which can be set by the group printer driver can also be set, and if the same function is set in the two drivers, processing is executed twice. To prevent this, the following UI control is executed to display items.

(1) If the member printer is a "function-controllable" driver, items which conflict with setting items in the group printer driver UI are grayed out or are not displayed so as not to set them in the member printer driver UI.

(2) If the member printer is a "function-uncontrollable" driver, common setting items are displayed in the UI with settings on the member printer driver. If the items are changed in the member printer driver UI after UI display, information on the setting items set in the group printer driver in a step of closing the driver UI is overwritten in the common setting items of a corresponding member printer driver to inhibit any setting change in the member printer UI. Note that whether function control is possible/impossible will be explained in detail later.

UI control processing in step S102 will be described with reference to FIGS. 11 to 16.

Figure 11:
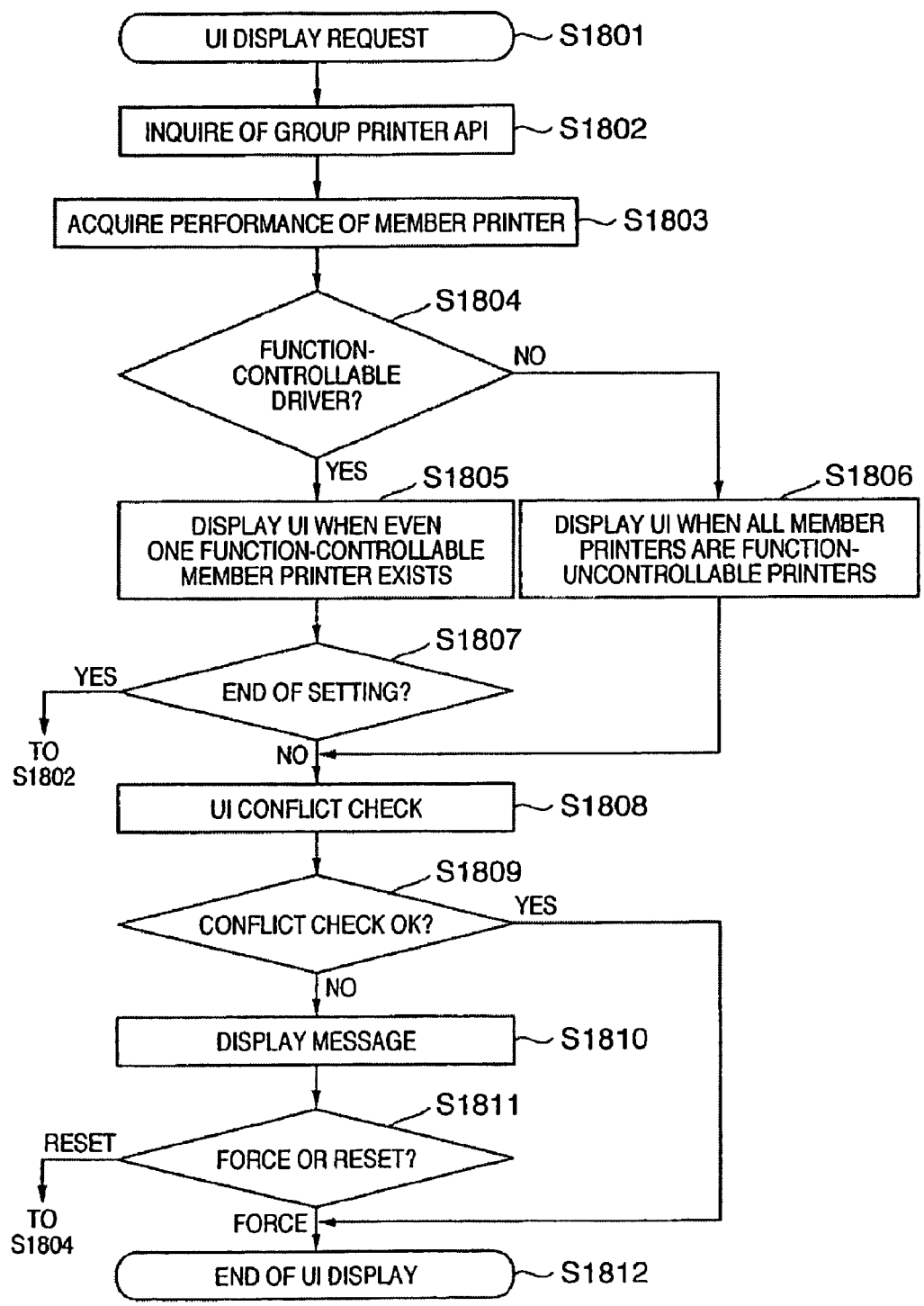
FIG. 11 is a flow chart showing details of UI control processing according to the embodiment.

FIG. 11 is a flow chart showing details of UI control processing in step S102.

If a UI display request is recognized via the OS in step S1801, a series of UI control processes start.

In step S1802, the identification IDs of member printer drivers which form a group printer driver are inquired and acquired by using the API of the print job control system. All member printer drivers which form a group printer mean printer drivers which are registered in advance in correspondence with the group printer driver. The identification ID of each member printer driver can be, e.g., a name assigned in registering a member printer driver, or an identification ID assigned by the program of the group printer driver in correspondence with the registered printer driver.

In step S1803, the performance of a member printer driver corresponding to the identification ID of each member printer driver obtained in step S1802 is acquired. More specifically, whether the driver performance can be acquired up to the enhanced setting items of driver setting information and whether the driver is a "function-controllable driver" capable of controlling the driver UI or another "function-uncontrollable driver are read out and determined for all member printer drivers which form a group printer. Further, the group printer driver makes an inquiry to each member printer driver corresponding to an identification ID, and function controllable/uncontrollable information of a "function-controllable driver" or "function-uncontrollable driver" is determined in accordance with a response to the inquiry from the member printer driver. Note that enhanced setting items will be described in detail later.

In step S1804, the type of member printer driver which forms a member printer is determined from the function controllable/uncontrollable information read out in step S1803.

The function controllable/uncontrollable information used in step S1803 will be explained in detail. "Functions are controllable" means that a printing setting (e.g., bookbinding margin (see FIG. 12B)) as an enhanced setting item can be designated from the software module of the job control print service 622 in FIG. 7, or a predetermined setting item can be controlled to be grayed out. To the contrary, "functions are uncontrollable" means that such function control cannot be performed. More specifically, SDK (Software Development Kit) developed to control a printer driver must be used to set the enhanced setting item of a printer driver and perform display control such as gray-out display. If the SDK of the printer driver cannot be installed in the system, functions cannot be controlled. For example, a printer driver designed by another vendor corresponds to a function-uncontrollable member printer.

The description returns to the flow chart of FIG. 11.

If even one "function-controllable" driver is determined in step S1804 to be included in member printers, the processing advances to step S1805. If member printer drivers are formed by only function-uncontrollable drivers, the processing advances to step S1806. Details of steps S1805 and S1806 will be described later with reference to FIGS. 13 and 14.

If the setting end button is clicked at an arbitrary timing, YES is determined in the setting end processing step S1807, and the processing returns to step S1802.

In step S1808, whether items set via the group printer driver UI do not conflict with the setting items of each member printer driver is checked (UI conflict check). For example, the position at which an A4 paper sheet can be stapled is only the upper left position of a paper sheet in printer 1, but only the lower left position of a paper sheet in printer 2. In this manner, some items are closely related to the functions of each device. In this step, whether items set via the group printer driver UI can be reflected as the setting items of each member printer driver is checked for each member printer driver, in addition to conflict check for a combination which is impossible in terms of setting functions.

In step S1809, the conflict check result is determined. If setting items set via the group printer driver UI are valid in all member printers, the processing advances to step S1812 to end the display of the group printer driver UI.

If setting items are determined from the conflict check result to include an item exhibiting a conflict, the processing advances to step S1810 to display resetting and force buttons together with a message "set again setting items in the group printer driver UI or printing processing with current setting items?". In step S1811, which of the resetting and force buttons has been clicked is determined. If the resetting button is determined to have been clicked, the processing returns to step S1804 to execute display control processing again.

If the force button is determined to have been clicked, the processing advances to step S1812 to end a series of processes concerning the display of the group printer driver UI, and shifts to processing of repeating a series of processes.

FIG. 12A shows an example of the correspondence between the member printer arrangement and settable items. In this example, only common setting items as shown in FIG. 12B can be set from a UI (step S1806) displayed when no function-controllable driver exists in member printers. Enhanced setting items can be set in addition to common setting items from a UI (step S1805) displayed when even one function-controllable driver exists in member printers.

Figure 13:
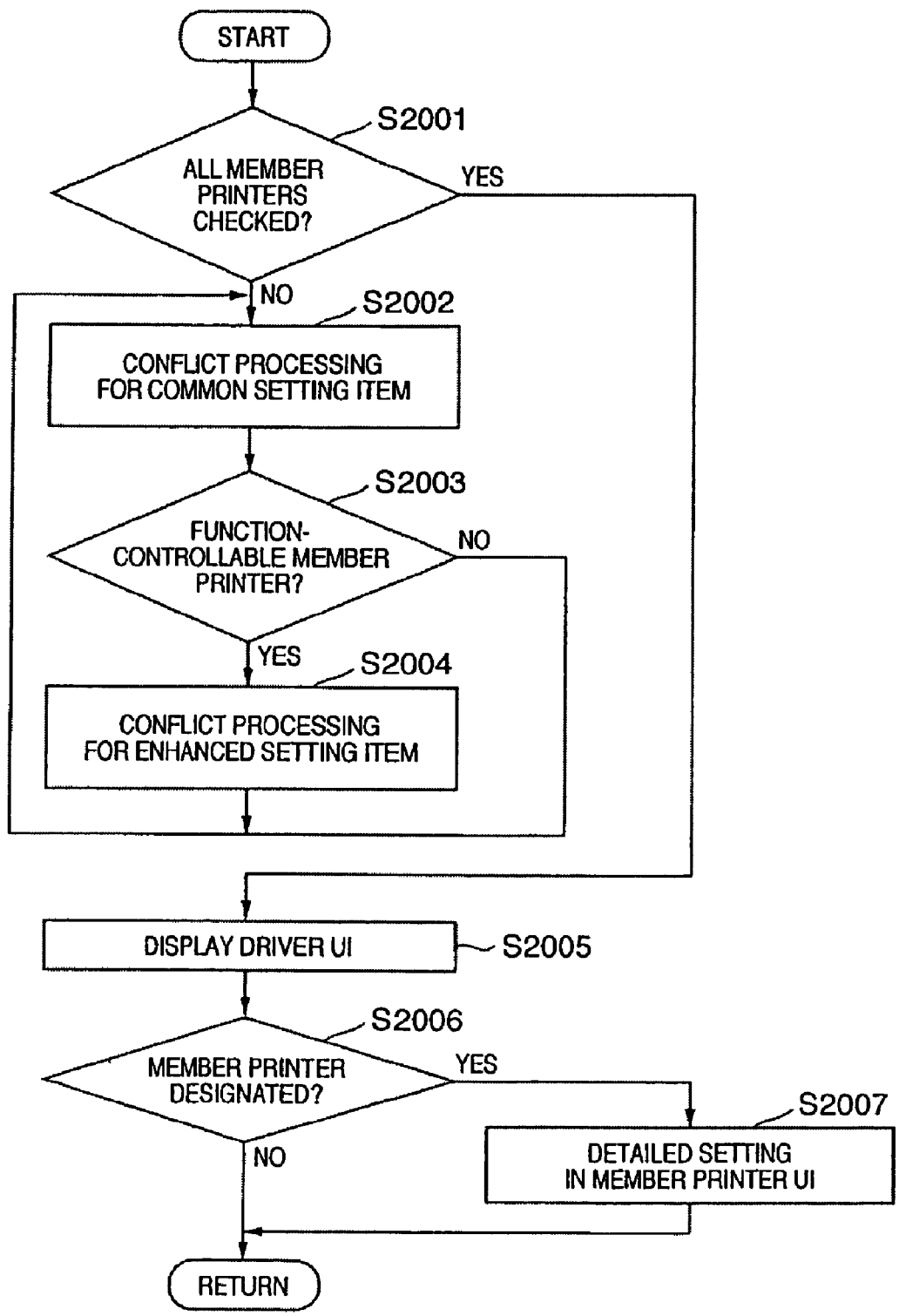
FIGS. 13 to 15 are flow charts showing details of UI control processing according to the embodiment.

FIG. 13 is a flow chart showing detailed processing of step S1805.

In step S2001, whether all member printers have undergone function conflict check in steps S2002 and S2004 is determined. If all member printers have been checked, the processing advances to step S2005; if NO, to step S2002.

In step S2002, conflict processing such as OR/AND calculation is performed for common setting items. The performance of each member printer driver for each common setting item is inquired, function conflict processing is executed, and control of selecting items to be displayed in the group printer driver UI is performed on the basis of the result of function conflict processing. In this step, all member printers undergo conflict check.

In step S2003, member printers are determined. If the functions of the member printers can be controlled, the processing advances to step S2004; if NO, returns to step S2001. In step S2004, conflict processing such as OR/AND calculation is performed for the enhanced setting items of function-controllable printers. If this step ends, the processing returns to step S2001.

In step S2005, items to be displayed in the group printer driver UI are extracted on the basis of the result of conflict processing in step S2004, and the UI is displayed on the basis of the extracted items. The user can easily perform settings which do not conflict between member printer drivers in accordance with the displayed items.

Note that a function not supported by any member printer driver as a result of conflict processing is so controlled as not to be set in the group printer driver UI.

In step S2006, processing of determining whether designation has been made to open the UI of any member printer which forms the group printer driver and set details in order to set an item determined in step S2002 or S2004 not to exhibit any conflict is performed.

If any member printer driver (member printer) which forms the group printer driver (group printer) is determined to have been designated, the processing shifts to step S2007. Details of processing in step S2007 will be described with reference to FIG. 14. Steps S2006 and S2007 in FIG. 13 have been described to be executed after step S2005, but may be executed at arbitrary timings.

Figure 14:
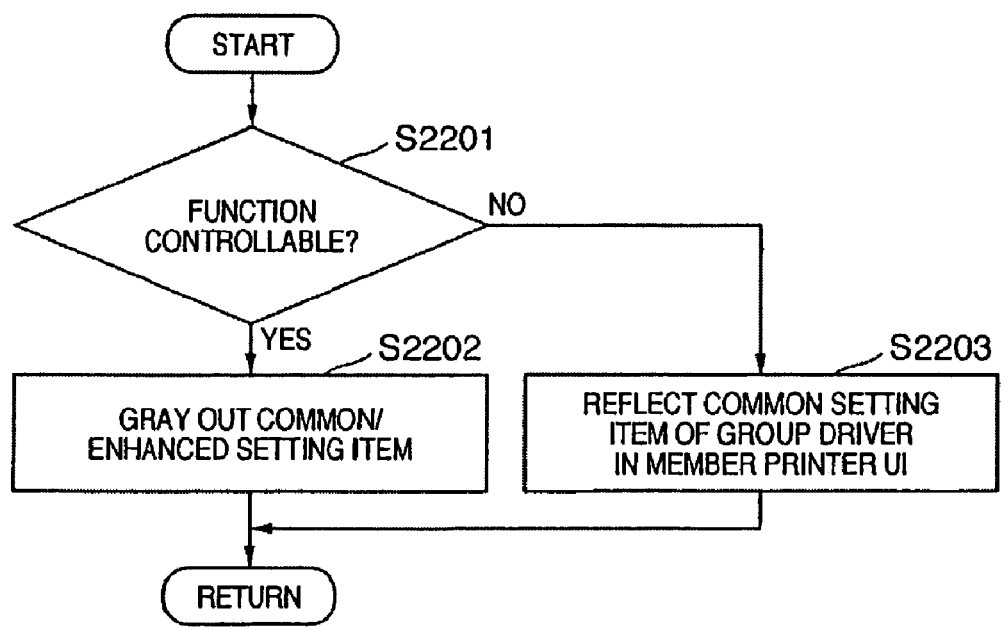

FIG. 14 is a flow chart showing more detailed processing contents in step S2007.

In step S2201, whether the function of a member printer driver specified via a mouse or the like in step S2006 can be controlled is determined. Determination of whether the function can be controlled has been described in step S1803.

If YES in step S2201, the display of items including common setting items and enhanced setting items is controlled in step S2202. Display control processing is performed in accordance with the same rule as rule (1) described in step S107 of the flow chart of FIG. 10.

If NO in step S2201, the display of the common setting item UI of the member printer driver is controlled in accordance with rule (2) described in the flow chart of FIG. 10.

Figure 15:
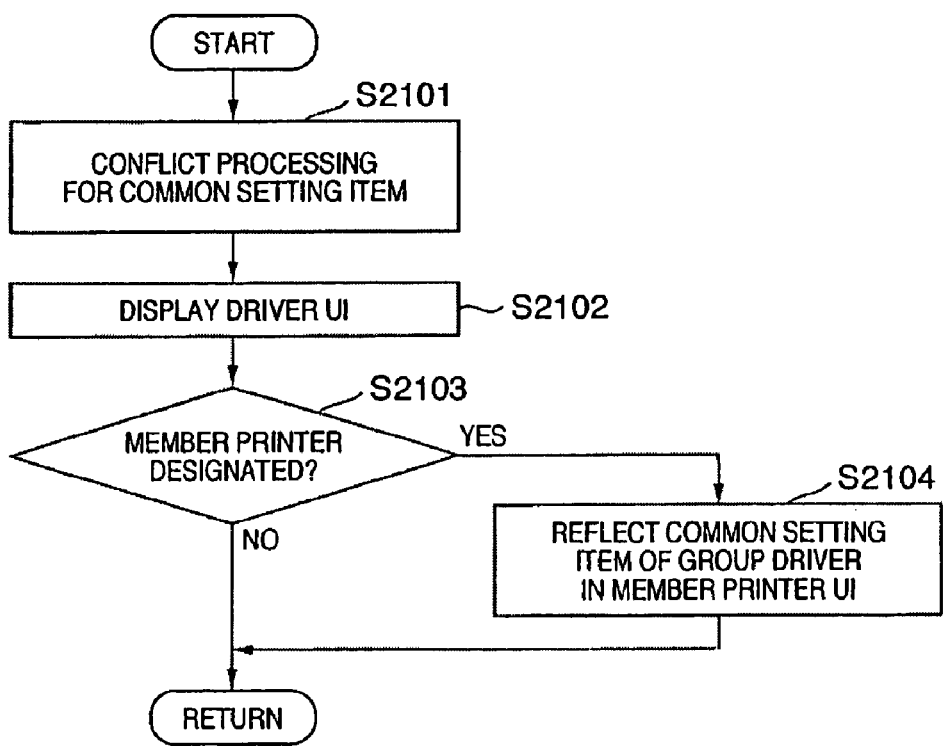

FIG. 15 is a flow chart showing details of step S1806 of FIG. 11.

In step S2101, the performance of each member printer driver for each common setting item is inquired, and the above-described conflict processing such as OR/AND calculation is executed. Items which can be set in the group printer driver UI are extracted on the basis of the result of conflict processing, and setting items to be displayed in the UI are determined.

In step S2102, the group printer driver UI is displayed on the basis of the setting items extracted as a result of conflict processing in step S2101. As for the item of a function which is not common between member printers and an item determined as an enhanced setting item as a result of conflict processing in step S2101, the items are grayed out or not displayed so as not to set the items in the group printer driver UI.

In step S2103, whether a member printer driver has been designated via a pointing device such as a mouse is determined. Designation of a member printer driver corresponds to processing of opening a member printer driver UI for detailed settings in order to set enhanced setting items not displayed in step S2102 or setting items unique to each member printer. If a member printer driver has been designated, the processing advances to step S2104.

In step S2104, the member printer driver UI designated in step S2103 is individually displayed, and detailed settings are done in accordance with a setting instruction to a setting item that is input via the displayed UI.

In step S2104, the target member printer driver is a function-uncontrollable one, and common setting items set via the group printer UI are reflected. If even a function-uncontrollable printer can be displayed and controlled at some items, these items undergo inhibit processing such as gray-out display so as not to repetitively set them via the group printer UI.

In step S2104, enhanced setting items having undergone inhibit processing can be set in the group printer via the individually displayed member printer UI. The set contents are reflected in the above-mentioned printing designation field 8a.

The above-described processes in steps S2103 and S2104 have been described to be performed after step S2102, but may be executed at arbitrary timings.

Figure 16:
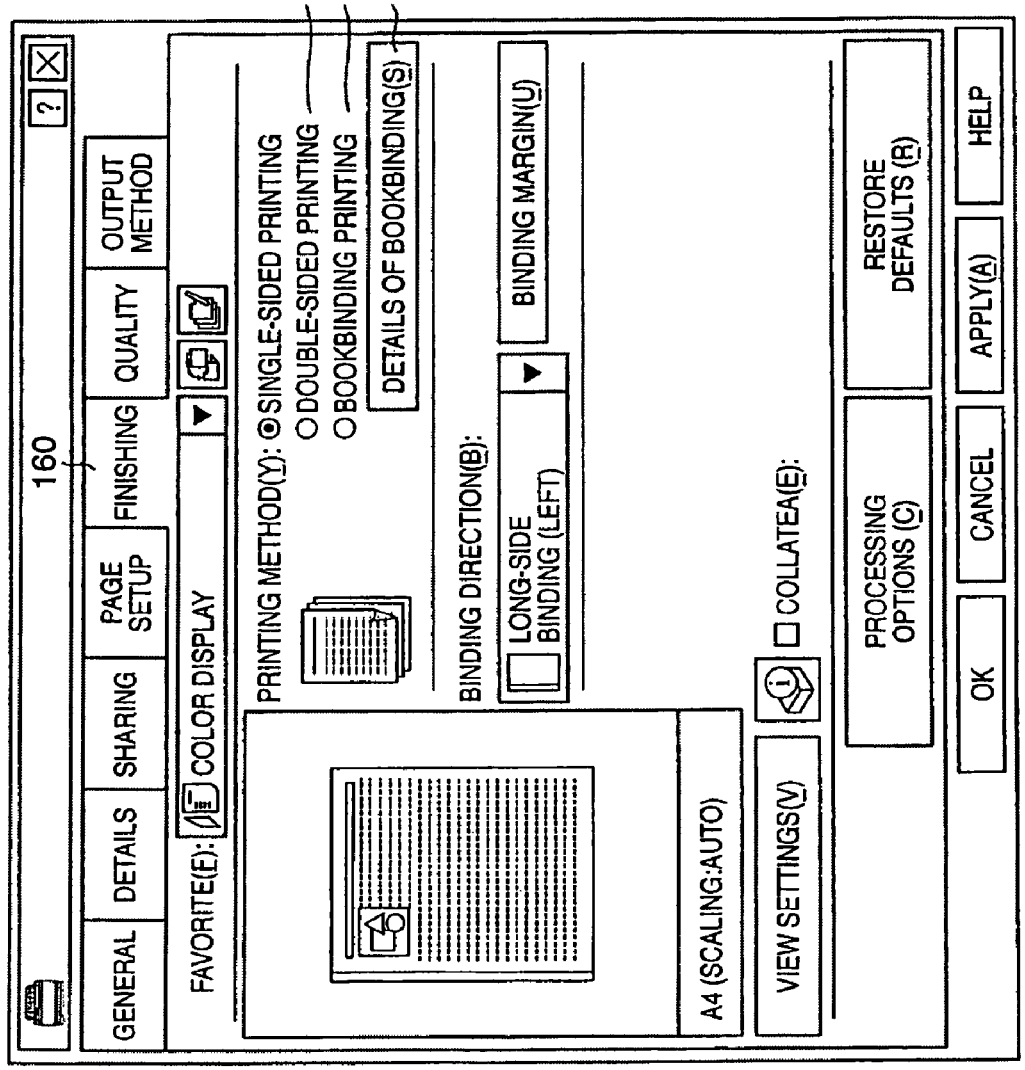
FIG. 16 is a view showing a display example of a group printer driver UI according to the embodiment.

FIG. 16 is a view showing a display example of a group printer driver UI displayed as the first UI providing step on the basis of the flow charts shown in FIGS. 11, 13, 14, and 15. In this example, a "finishing" tab 160 is selected to provide a printing finishing setting window by the group printer driver UI. In this example, items 161, 162, and 163 are grayed out and cannot be selected as items which cannot be set from the group printer UI. Instead of gray-out display, these items may not be displayed. Setting items corresponding to functions common between member printer drivers as a result of conflict processing are not subjected to gray-out display or non-display control, and are reflected in the user interface in a selectable form.

In this fashion, printing settings can be efficiently done from the group printer driver UI for items concerning predetermined printing processing which are common between all printers, and items corresponding to predetermined printer functions. As for functions concerning predetermined printing processing (e.g., redirect processing) which are not common between printers, settings are so controlled as not to be performed or to be invalid from the group printer driver UI displayed as the first UI providing step.

Registration processing of a group printer and member printer in the embodiment will be explained.

In the embodiment, for example, "ratio distributed processing", "color/monochrome distributed printing", "broadcast printing", and "redirect printing" can be selected as an output method by opening the group printer driver UI. A member printer driver is designated and set for each output method, enabling designation of a plurality of printing operations by one printer driver.

Figure 17:
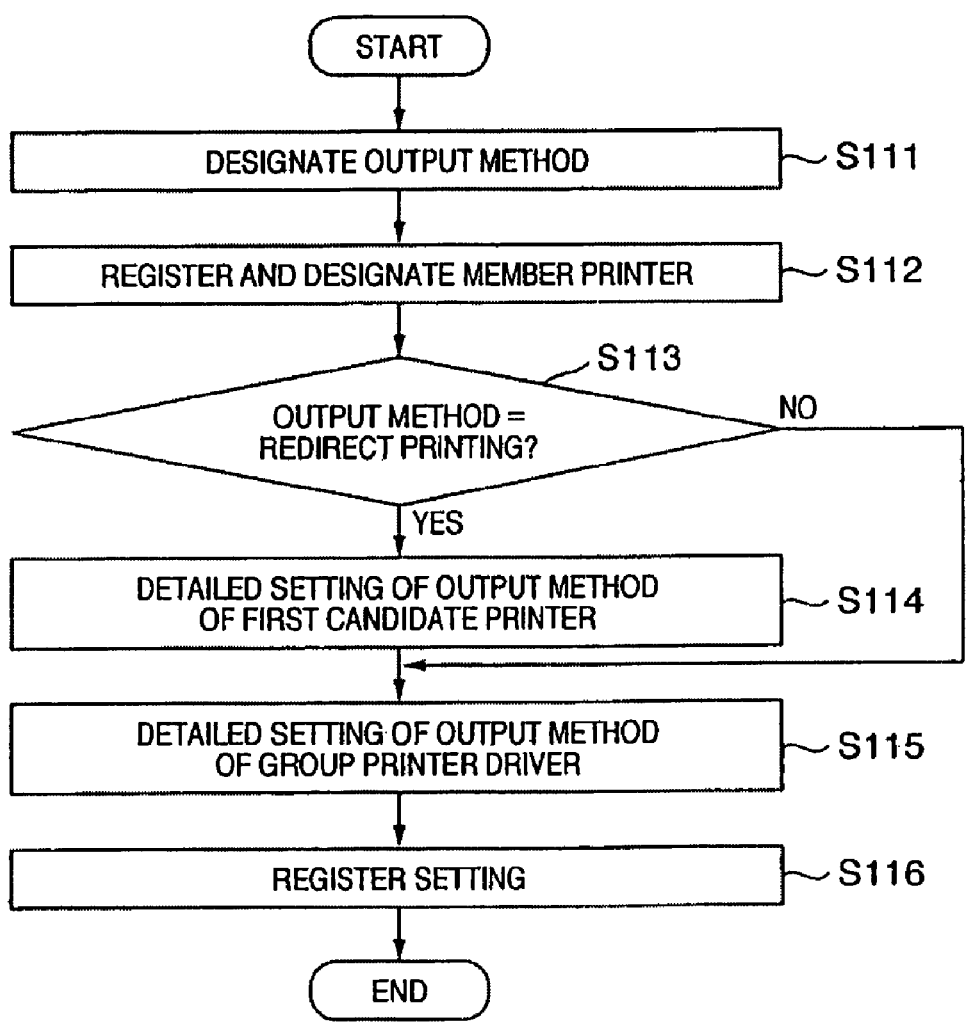
FIG. 17 is a flow chart showing operation processing using a group printer driver UI according to the embodiment.

FIG. 17 is a flow chart showing operation processing using the group printer driver UI in the embodiment. Selection of "redirect printing" will be exemplified.

In step S111, an output method is designated. As described above, "ratio distributed processing", "color/monochrome distributed printing", "broadcast printing", and "redirect printing" can be selected as an output method.

The processing advances to step S112 to register and designate a member printer suited to each output method.

In step S113, whether redirect printing has been selected as an output method is determined. If NO in step S113, the processing directly advances to step S115; if YES, advances to step S114 to perform detailed settings for the output method of the first candidate printer driver. In step S115, detailed settings are done for the group printer driver.

In step S116, contents set in steps S114 and S115 are registered. The registered setting items are used in printing by recording the setting items in a general-purpose print file shown in FIG. 8. For example, the setting items are recorded in the printing designation field 8a of the general-purpose print file, and particularly the setting items in step S111 are recorded using the output method designation field 805. The recorded items are utilized as default setting values in displaying various UIs. That is, the items are held in a predetermined referable storage area as the attributes of a group printer (virtual printer) and member printers, separately from the general-purpose print file.

Of the setting items in step S112, the member printer count and member printer driver name are recorded using a member printer driver information setting field. The setting items in steps S114 and S115 are recorded using a group printer driver setting information field.

The above description assumes selection of "redirect printing", but the same operation sequence applies to selection of another output method.

Figure 18:
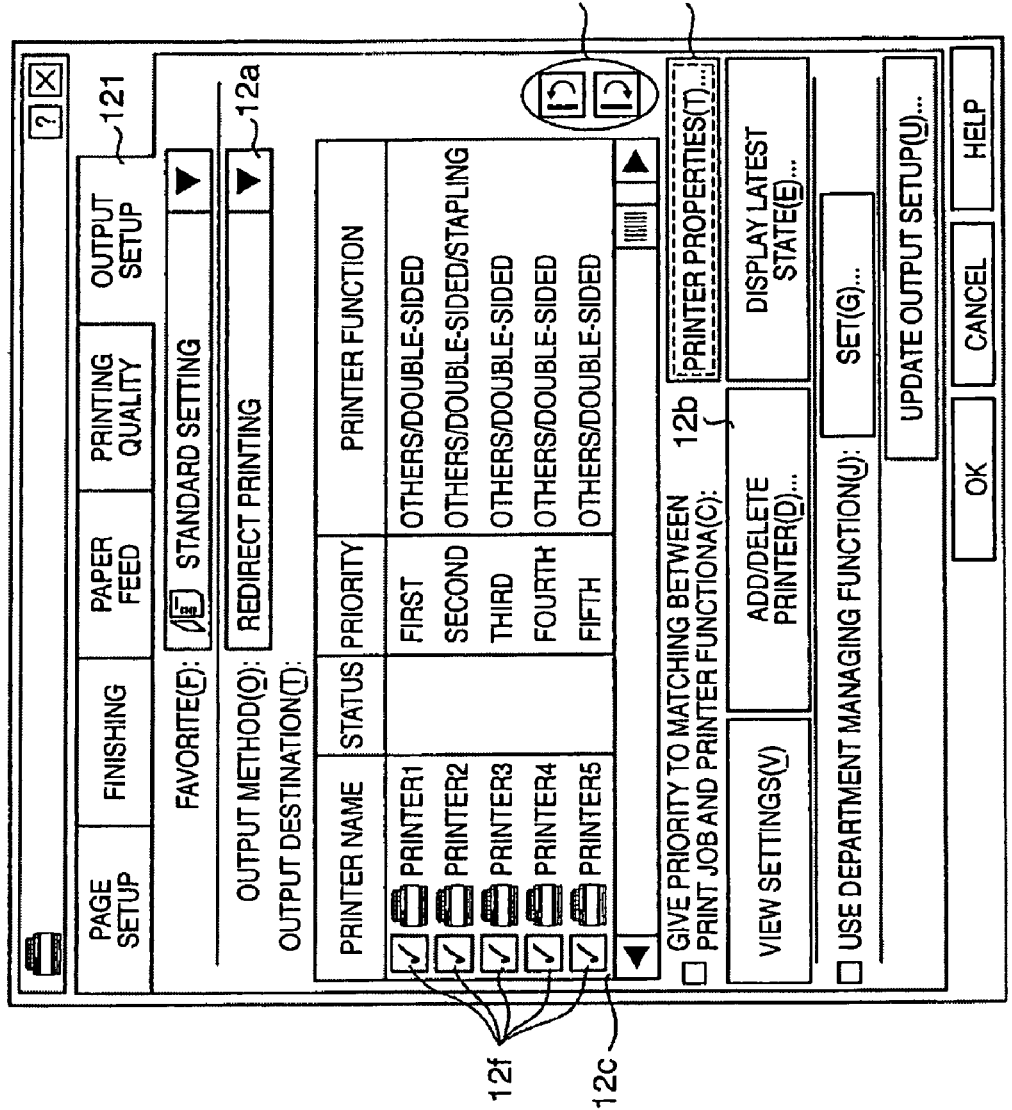
FIG. 18 is a view showing an example of the group printer driver UI according to the embodiment.

The UI according to the embodiment will be exemplified with reference to FIGS. 18 and 19.

FIG. 18 is a view showing an example of a group printer driver UI 12 according to the embodiment. In this example, the group printer driver UI provides an output method setting window upon selecting the "output setup" tab 121. In FIG. 18, reference numeral 12a denotes a combo box which is different from that shown in FIG. 9 and is used to select an output method. The combo box 12a corresponds to selection via the combo box of FIG. 9, and also to step S101. In FIG. 18, redirect printing is selected as an output method.

Reference numeral 12b denotes a button for opening a registration UI for adding/deleting a member printer.

Reference numeral 12c denotes a list box which displays a list of member printers after the member printers are registered. The contents of the list display are also changed in accordance with the output method designated in the combo box 12a. In the list box 12c, reference numerals 12f denote check boxes for temporarily deleting or adding a registered member printer from or to output target printers. When a check box is checked, the member printer is regarded as a target printer; when a check box is not checked, the member printer is temporarily deleted from target printers. Since target printers are selected in step S112, the selected target printers can be temporarily deleted in the check boxes.

In FIG. 18, redirect printing is selected as an output method (12a). The priority order (order of the first candidate, second candidate, third candidate, . . . ) of member printers in printing can be changed with a button 12d.

Reference numeral 12e denotes a button for opening the property window of a member printer driver. A target member printer can be selected from the list of the list box 12c, and the property of the member printer can be set.

Contents set in the UI of FIG. 18 are recorded in the general-purpose print file of FIG. 8. The output method set in the combo box 12a is recorded in the output method designation field 805 of FIG. 8. If a member printer is added or deleted with the button 12b, the member printer count and member printer name are recorded in the member printer count 806 and member printer driver name 807 of FIG. 8.

As described with reference to FIG. 16, printing settings can be performed from the group printer driver UI for items concerning predetermined printing processing which are common between all printers. In addition, one printer can be designated from a plurality of printers by setting the priority order of the printers for predetermined printing processing (e.g., redirect printing).

FIG. 19 is a view showing an example in which a group printer driver UI and member printer driver UI are simultaneously contained and displayed in accordance with processes in steps S103 and S104 of FIG. 10.

A UI 16 corresponds to the UI of a highest-priority printer driver in the list box 12c and button 12d of the group printer driver UI 12. Contents set via the UI 16 are reflected in the corresponding items of FIG. 8 including the printing designation field 8a. The contents are also reflected in DEVMODE corresponding to a representative member printer, and used to instruct each member driver of the above-described despooler 701 to print.

The UI 12 contains setting items unique to virtual job setting such as an item for setting the arrangement of a plurality of member printers, e.g., the priority order in redirect printing for a virtual job (distributed printing, broadcast printing, or the like). In setting a virtual job, the UI 12 contains a function which assists the UI 16. Setting items are not limited to items in FIG. 19, and may properly contain setting items unique to a virtual job (distributed printing, redirect printing, or the like) such as "gray scale", "resolution", and "compression method" though not shown in the UI 12 of FIG. 19. Setting items unique to a virtual job may be contained in the same sheet as "output setup" of the UI 12 in FIG. 19 or in another sheet.

A single window parallel-displays, as the second UI providing step, the UI 12 which contains setting items for creating intermediate data (general-purpose print intermediate format data for creating a general-purpose print file) and setting items for setting the arrangement of a plurality of member printers in a virtual job (distributed printing, broadcast printing, or the like), and the individual UI 16 of a printer driver set to the highest priority in the list box 12*c* and button 12*d* of the group printer driver UI 12. Hence, detailed printing settings for the highest-priority printer can be easily displayed without clicking another button to invoke the settings.

In FIG. 19, the UIs 12 and 16 are separately displayed. Alternatively, a UI corresponding to a representative member printer having the highest priority in accordance with designation of a virtual printer corresponding to the redirect printing output method may contain setting items for setting the arrangement of a plurality of member printers and setting items for creating intermediate data.

A conventional group driver setting UI can display only items settable in the group printer driver (i.e., common setting items), and does not provide a setting environment considering the feature of each virtual output method regardless of various output methods. As for a function not contained in common setting items, an environment setting UI provided by an OS must be invoked with, e.g., a mouse in the conventional group printer driver setting UI. The function must be separately set via a printer setting UI from the environment setting UI and a printing setting UI from the printer setting UI.

To the contrary, for example, detailed settings of a highest-priority member printer which hardly generates an error and is used in most cases can be performed parallel to settings of a group printer driver in the group printer driver UI as shown in FIG. 19 according to the embodiment. An output method such as distributed printing or broadcast printing except redirect printing can be efficiently set in accordance with the flows shown in FIGS. 11, 13, 14, and 15.

As described above, according to the embodiment, the group printer driver UI facilitates printing settings for a highest-priority member printer in "redirect on error" printing in the "redirect on error" printing system. When a highest-priority printer which hardly generates an error and is used in most cases is known, the detailed settings can be easily done in the group printer UI without any operation of opening the printing setting window of the printer.

Other Embodiment

The embodiment of the present invention has been described in detail. The present invention can take an embodiment as a system, apparatus, method, program, storage medium, or the like. The present invention may be applied to a system including a plurality of devices or an apparatus formed from a single device.

The present invention is also achieved by supplying a software program (programs corresponding to the flow charts shown in FIGS. 10, 11, and 13 to 15) for realizing the functions of the above-described embodiment to a system or apparatus directly or from a remote place, and reading out and executing the supplied program codes by the computer of the system or apparatus. In this case, the form need not be a program as far as a program function is obtained.

The present invention is therefore realized by program codes installed in the computer in order to realize functional processing of the present invention by the computer. That is, the claims of the present invention include a computer program for realizing functional processing of the present invention.

In this case, the present invention can take any program form such as an object code, a program executed by an interpreter, or script data supplied to an OS as long as a program function is attained.

A recording medium for supplying the program includes a flexible disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be realized by grouping program codes which constitute the program of the present invention into a plurality of files, and downloading the files from different homepages. That is, the claims of the present invention also include a WWW server which allows a plurality of users to download the program files for realizing functional processing of the present invention by a computer.

The program of the present invention can be encrypted, stored in a storage medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes the readout program codes. Also, the functions of the above-described embodiments are realized when an OS or the like running on the computer performs part or all of actual processing on the basis of the instructions of the program codes.

Furthermore, the functions of the above-described embodiment are also realized when the program read out from the recording medium is written in the memory of a function expansion board inserted into the computer or the memory of a function expansion unit connected to the computer, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

What is claimed is:

1. A control method in a printing control apparatus capable of executing printing processing of a predetermined output method using a plurality of member printers grouped as a virtual printer, said method comprising:

a registration step of registering a plurality of the member printers as a virtual printer;

a setting step of setting a virtual printer registered in the registration step to any one of a plurality of output methods about how to use the plurality of member printers, wherein the output methods include (a) a redirect printing method which automatically switches, when an error occurs in a printer to which a print job has been transmitted, to another printer of the plurality of member printers, and (b) a distributed printing method which distributes a print job to the plurality of member printers;

a receiving step of receiving an instruction to display a user interface for setting print properties of a designated virtual printer;

a checking step of checking, upon receiving the instruction, which output method is set for the designated virtual printer;

a first providing step of providing, when it is checked in the checking step that the designated virtual printer is set to the distributed printing method, a first user interface of the virtual printer by performing a conflict process of functions of the plurality of member printers grouped as the virtual printer to compare functions of the plurality of member printers, the first user interface not including a setting item for independently setting the plurality of member printers grouped as the virtual printer; and a second providing step of providing, when it is checked in the checking step that the designated virtual printer is set to the redirect printing method, a second user interface of the virtual printer without performing the conflict process, the second user interface (a) including a setting item for independently setting a representative member printer of the plurality of member printers grouped as the virtual printer, (b) not including a setting item for independently setting other member printers of the plurality of member printers grouped as the virtual printer, and (c) including a priority order for redirect printing of the plurality of member printers grouped as the virtual printer, the priority order for redirect printing displaying the order of automatic switching when an error occurs.

2. The method according to claim 1, wherein the second user interface comprises a user interface of a printer driver of the representative member printer and a user interface of a printer driver of the virtual printer.

3. The method according to claim 2, wherein the user interface of the printer driver of the virtual printer contains a setting item for creating intermediate data.

4. The method according to claim 1, further comprising a designation step of issuing, to the member printer, a designation of converting a drawing instruction based on intermediate data created on the basis of application data into a predetermined page description language.

5. A printing control apparatus capable of executing printing processing of a predetermined output method using a plurality of member printers grouped as a virtual printer, said apparatus comprising:

registration means for registering a plurality of the member printers as a virtual printer;

setting means for setting a virtual printer registered by the registration means to any one of a plurality of output methods about how to use the plurality of member printers, wherein the output methods include (a) a redirect printing method which automatically switches, when an error occurs in a printer to which a print job has been transmitted, to another printer of the plurality of member printers, and (b) a distributed printing method which distributes a print job to the plurality of member printers;

receiving means for receiving an instruction to display a user interface for setting print properties of a designated virtual printer;

checking means for checking, upon receiving the instruction, which output method is set for the designated virtual printer;

first providing means for providing, when it is checked by the checking means that the designated virtual printer is set to the distributed printing method, a first user interface of the virtual printer by performing a conflict process of functions of the plurality of member printers grouped as the virtual printer to compare functions of the plurality of member printers, the first user interface not including a setting item for independently setting the plurality of member printers grouped as the virtual printer; and second providing means for providing, when it is checked by the checking means that the designated virtual printer is set to the redirect printing method, a second user interface of the virtual printer without performing the conflict process, the second user interface (a) including a setting item for independently setting a representative member printer of the plurality of member printers grouped as the virtual printer, and (b) not including a setting item for independently setting other member printers of the plurality of member printers grouped as the virtual printer, and (c) including a priority order for redirect printing of the plurality of member printers grouped as the virtual printer, the priority order for redirect printing displaying the order of automatic switching when an error occurs.

6. The apparatus according to claim 5, wherein the second user interface comprises a user interface of a printer driver of the representative member printer and a user interface of a printer driver of the virtual printer.

7. The apparatus according to claim 6, wherein the user interface of the printer driver of the virtual printer contains a setting item for creating intermediate data.

8. The apparatus according to claim 5, further comprising designation means for issuing, to the member printer, a designation of converting a drawing instruction based on intermediate data created on the basis of application data into a predetermined page description language.

9. A computer-readable recording medium having a computer-executable program stored thereon for executing the method according to claim 1.

* * * * *